(12) United States Patent  
Cornthwaite et al.

(10) Patent No.: US 10,891,853 B2  
(45) Date of Patent: Jan. 12, 2021

(54) METHOD AND SYSTEM FOR CLASSIFYING TRAFFIC FLOW

(71) Applicant: TNICO Technology Division Ltd., Leduc (CA)

(72) Inventors: Don Cornthwaite, Edmonton (CA); Daniel Raju, Edmonton (CA); Troy Peacock, Edmonton (CA); Ben Cote, Edmonton (CA)

(73) Assignee: TNICO Technology Division Ltd.

( * ) Notice: Subject to any disclaimer, the term of this patent is extended or adjusted under 35 U.S.C. 154(b) by 39 days.

(21) Appl. No.: 15/319,641

(22) PCT Filed: Jun. 23, 2015

(86) PCT No.: PCT/CA2015/050582  
§ 371 (c)(1),  
(2) Date: Dec. 16, 2016

(87) PCT Pub. No.: WO2015/196284  
PCT Pub. Date: Dec. 30, 2015

(65) Prior Publication Data  
US 2017/0213453 A1 Jul. 27, 2017

Related U.S. Application Data

(60) Provisional application No. 62/016,217, filed on Jun. 24, 2014.

(51) Int. Cl.  
*G08G 1/01* (2006.01)  
*G06F 3/0346* (2013.01)  
(Continued)

(52) U.S. Cl.  
CPC ......... *G08G 1/0133* (2013.01); *G06F 3/0346* (2013.01); *G06F 3/04883* (2013.01);  
(Continued)

(58) Field of Classification Search  
USPC .................................................. 701/117, 118  
See application file for complete search history.

(56) References Cited

U.S. PATENT DOCUMENTS 4,916,621 A    4/1990   Bean et al.  
5,699,056 A *  12/1997  Yoshida ................. G01C 21/26  
                                                340/905  
(Continued)

FOREIGN PATENT DOCUMENTS

JP    2002042289 A    2/2002  
JP    2011191923 A    9/2011  
(Continued)

*Primary Examiner* — Imran K Mustafa  
(74) *Attorney, Agent, or Firm* — McMillan LLP

(57) ABSTRACT

A method, device and system for measuring the volume, classification, direction, and turning movement of vehicular and/or pedestrian traffic through a given location in a given time period. The device is portable and incorporates a touch screen. A set of buttons corresponding to each direction at the location are selected by the user to count particular types of vehicles. The buttons are mapped to fields in a database on a server. The fields correspond to a particular direction. When the orientation of the portable device changes, the buttons are remapped to different database fields than originally mapped. The new fields corresponding to the orientation. The collected data may be transmitted to a server.

15 Claims, 17 Drawing Sheets

(51) Int. Cl.
*G06F 3/0488* (2013.01)
*H04B 1/3827* (2015.01)

(52) U.S. Cl.
CPC ........... *G08G 1/012* (2013.01); *G08G 1/0129* (2013.01); *H04B 1/3833* (2013.01)

(56) References Cited

U.S. PATENT DOCUMENTS

| | | | | |
|---|---|---|---|---|
| 7,421,334 | B2* | 9/2008 | Dahlgren | G07C 5/008 340/989 |
| 2002/0140675 | A1* | 10/2002 | Ali | A61B 5/0002 345/158 |
| 2004/0143385 | A1 | 7/2004 | Smyth et al. | |
| 2007/0265935 | A1* | 11/2007 | Woycik | G06Q 20/367 705/65 |
| 2014/0232566 | A1* | 8/2014 | Mimeault | G01S 17/023 340/935 |
| 2015/0116363 | A1* | 4/2015 | Monte | G06T 3/60 345/659 |

FOREIGN PATENT DOCUMENTS

| WO | WO0068915 | 11/2000 |
|---|---|---|
| WO | WO2005093688 A1 | 10/2005 |

\* cited by examiner

FIG. 9B

METHOD AND SYSTEM FOR CLASSIFYING TRAFFIC FLOW

RELATED APPLICATIONS

This application claims priority to U.S. Provisional Application No. 62/016,217 filed Jun. 24, 2014; the contents of which are herein expressly incorporated by reference in their entirety.

FIELD OF THE INVENTION

The present invention relates generally to measuring traffic flow. More particularly, the present invention relates to a method and system for measuring the Volume and Classification of vehicular and/or pedestrian traffic flow through a given set of coordinates in a given time period.

BACKGROUND OF THE INVENTION

A number of traffic monitoring systems exist that collect data related to vehicle motion through a location. These traditional approaches use pressure hoses, piezoelectric sensors, and induction coils to detect the passage of vehicles. These methods typically have low reliability, require calibration, and are difficult to install and maintain. The detector is physically laid out under or on the surface of the road resulting in high operating costs and/or risk to the installer as the sensor is laid across the road. Alternative systems use radar or laser-based sensors but are expensive and highly sensitive to environmental conditions. Furthermore, these sensors all have difficulty providing extensive information about the vehicles by providing only vehicle count, traffic speed, volume, and direction of travel.

United States Patent Application 2013/0278767 to Xerox Corporation discloses using a compressed video sequence obtained from a traffic camera for vehicle counting. The compressed video sequence is transmitted over a communication network. To obtain statistics about traffic flow of a certain highway or road, an algorithm processes the compressed data stream and counts vehicles.

Another tracking system produced by MioVision of Kitchener, Ontario, Canada uses a camera mounted above the intersection to capture images of the intersection. Processing of the video using a proprietary system counts and classifies the vehicle, bike, and pedestrian traffic.

Many municipalities use these aforementioned technologies; however, due to expense, the number of sites that may be monitored at any given time is limited due to equipment costs. The sensors cannot be moved readily to a new site if problems are reported whereas a more portable device may be quickly dispatched. As such, municipalities supplement these technologies using manual data collection processes which are prone to errors and cognitively difficult on the user at very busy intersections. It can be very difficult for a user to collect data and classify both vehicles and pedestrians from two or more directions.

In view of some of the problems recited above, there at least exists a need for a system and method for collecting data, including vehicle counts, and classifying vehicles and pedestrians where a user can more effectively and accurately record the information.

SUMMARY OF THE INVENTION

According to one aspect of this invention, a device for collecting traffic data comprising: a touch screen display; a computer readable medium; a processor executing instructions stored on said computer medium readable medium for: displaying on the touch screen display a representation of one or more roads; displaying on the touch screen display at least one data collection button associated with each of the roads; associating each of the at least one data collecting buttons with an associated counter; the touch screen display detecting contact with the at least one data collection button and the processor incrementing the associated counter in response to the contact.

According to another aspect of the present invention, the traffic data collecting device further comprising the processor displaying an orientation indicator on the touch screen display. When the touch screen display detects contact with the orientation indicator in a region different from the original orientation, a new orientation is selected. Alternatively, touching the orientation indicator cycles the orientation through the cardinal directions. For example, a contact changes the orientation from North to East, a subsequent touch changes it from East to South, then from South to West, and finally back to North. 4.

According to another aspect of the present invention, the traffic data collecting device further comprising an orientation sensor configured to report a current orientation; the processor processing the current orientation to determine a new orientation; and updating the orientation indicator. The orientation indicator may be updated during a calibration period.

Another aspect of the present invention, on an orientation change, the processor maps each counter with a different database field corresponding to the new orientation. Alternatively, another aspect of the present invention, on an orientation change, the processor associates each data collection button with a different counter corresponding to the new orientation.

According to another aspect of the present invention, the traffic data collecting device further comprising the processor executing instructions to display at least one multiplier button on the display; the touch screen detecting contact with the at least one multiplier button and detecting contact with at least one data collection button; the processor adding the contacted data collection buttons to a multiplier list wherein subsequent contacts with the contacted data collection buttons are multiplied by a multiplier corresponding to the at least one multiplier button.

According to another aspect of the present invention, the traffic data collecting device further comprising the processor executing instructions to display a multiplier reset button; the touch screen detecting contact with the multiplier reset button; whereby the processor removes all data collection buttons from the multiplier list.

According to another aspect of the present invention, the traffic data collecting device further comprising a transceiver automatically transmitting each counter according to a time interval. The time interval may be 5 minutes or 15 minutes or some other interval. The processor may reset each counter value on successful transmission by the transceiver. The processor executing instructions to display a send button; the touch screen display configured to detect contact with the send button initiating the transceiver to transmit each counter.

The traffic data collecting device further comprising the processor executing instructions to display a vehicle data collection screen and a pedestrian data collection screen.

Another aspect of the present invention may be a computer-implemented method for monitoring traffic on a portable device comprising: presenting on the display of the portable device, a representation of one or more roads; placing at least one data collection button proximate to each of the roads; each of the data collection buttons being mapped to an associated counter; incrementing said associated counter said corresponding data collection button is contacted; determining an orientation change of the portable device; remapping each data collection button from the originally mapped counter to a different counter based on the orientation of the portable device. In another aspect, data is received from the database residing on a server accessible over a network.

According to another aspect of the present invention, a traffic data collecting system comprising: a processor executing instructions from at least one memory to a touch screen display: an intersection; the intersection having a plurality roads dividing a portion of the display into sections; a set of data collection buttons within each section and proximate to one of the plurality of roads; the set of data collection buttons comprising: at least one data collection button for a left turn; at least one data collection button for a right turn; at least one data collection button for a straight direction; each of the data collection buttons having an associated counter; the touch screen display configured to detect contact with one of the data collection buttons and the processor configured to increment the associated counter in response to the contact; and a transceiver transmitting each counter over a network to a server whereby each counter is mapped to a database field in a database; the database field corresponding to an original orientation.

BRIEF DESCRIPTION OF THE DRAWINGS

An embodiment will now be described, by way of example only, with reference to the attached Figures, wherein:

FIGS. 9A and 9B show a screen layout diagram, and a quadrant map of a pedestrian data collection screen;

DETAILED DESCRIPTION OF THE EMBODIMENT

While the Background of Invention described above has identified particular issues known in the prior art, the present invention provides, in part, a new and useful application for collecting and monitoring vehicle and pedestrian traffic through an location that extend beyond or used in addition to those prior art systems. A location may be, but not limited to, a tangent section of road, interchange, traffic circle, bridges, cloverleaf, or intersection having a stop sign or stop lights of various configurations. For the purposes of the embodiments described herein, a location will be described with reference to an "intersection." The inventor contemplates that the techniques could equally apply to other types of locations.

Figure 1:
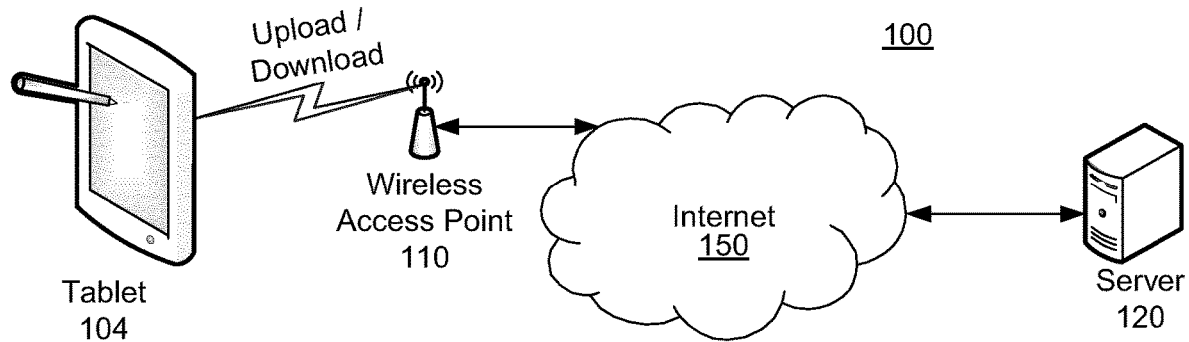
FIG. 1 shows a high-level architecture of a system for measuring traffic flow using a tablet device.

FIG. 1 demonstrates a high-level hardware architecture 100 of the present embodiment. A user interacts with a portable device 104 such as a smartphone, a tablet computer, or some other similar device. The portable device is in wireless communication with a wireless access point 110 using any number of different wireless protocols such as 3G, 4G, LTE, WiFi, Bluetooth® or other wireless communication channels known in the art. The wireless access point 110 allows the portable devices 104 to communicate over the Internet 150 with an offsite server 120.

Figure 2:
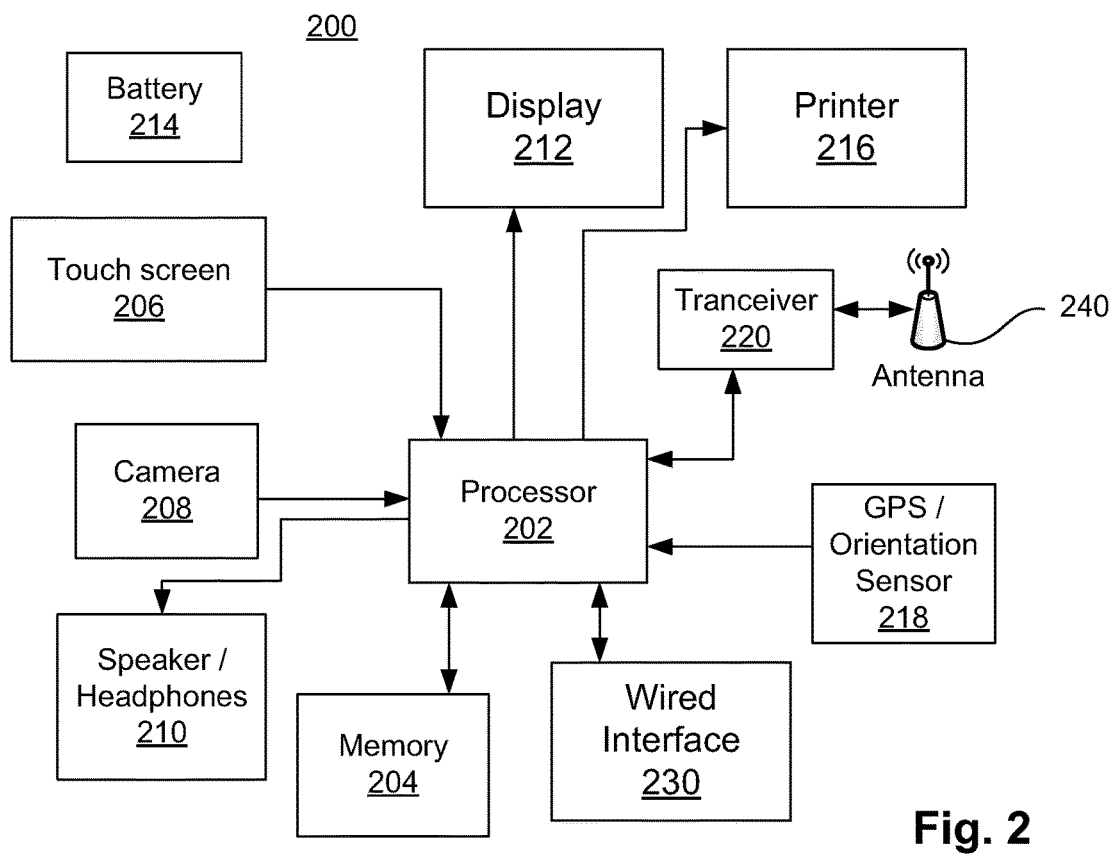
FIG. 2 shows an architecture of a tablet device that may be used to implement various parts of the invention.

The components of an exemplary portable device 200 are further disclosed in FIG. 2 having a processor 202 executing instructions from computer-readable medium 204 such as volatile and/or non-volatile memory and storing data thereto. The portable device 200 may have a number of human-computer interfaces such as a keypad or touch screen 206, a camera 208, a speaker or headphones 210, a GPS/Orientation Sensor 218, a display 212, and/or a printer 216. The portable device 200 has a battery 214 supplying power to all the hardware components within the device. The battery 214 may be charged using wired or wireless charging. Alternatively, the portable device 200 may be supplied by wired power using a 110V AC/DC power adaptor.

The portable device 200 may have a touch screen 206 aligned with the display 212 to enable input by the user directly on the display 212. The touch screen 206 may be any type of touch technology such as analog resistive, capacitive, projected capacitive, ultrasonic, infrared grid, camera-based (across touch surface, at the touch surface, away from the display, etc), in-cell optical, in-cell capacitive, in-cell resistive, electromagnetic, time-of-flight, frustrated total internal reflection (FTIR), diffused surface illumination, surface acoustic wave, bending wave touch, acoustic pulse recognition, force-sensing touch technology, or any other touch technology known in the art. The touch screen 206 could be a single touch or multi-touch screen.

The display 212 is typically small-sized between the range of 2.5 inches to 17 inches on the diagonal to enable portability and has a resolution high enough to ensure readability of the display 212 at in-use distances. The display 212 may be a pixel display of any type, plasma, e-Ink®, projected, light emitting diode (LED), liquid crystal display (LCD) or any other display technology known in the art. The display 212 is typically sized to be approximately the same size as the touch screen 206. The user controls the information displayed on the display 212 using either the touch screen 206 or optionally using a keyboard.

The portable device 200 has a network transceiver 220 coupled to an antenna 240 for the processor to communicate with the wireless access point 110. For example, the portable device 200 may have a WiFi®/Bluetooth® transceiver 220 and antenna 240; and/or a cellular transceiver 220 and antenna 240. The portable device 200 optionally also may have a wired interface 230 such as USB or Ethernet connection generally used for mass data transfers from the internal computer-readable medium 204.

Using these hardware components of the portable device 200, the user may download applications over the Internet from the server 120. The applications may be installed in the non-volatile memory 204 (or external memory such as a USB key, SD card or other portable memory) of the portable device 200 and executed by the processor 202. The applications (or a portion thereof) may be displayed on the display 212 or executed in the background. The applications may also communicate over the Internet 150 to the server 120 using the transceiver 220 and antenna 240. One such application may be a traffic monitoring application as described further herein.

Figure 3:
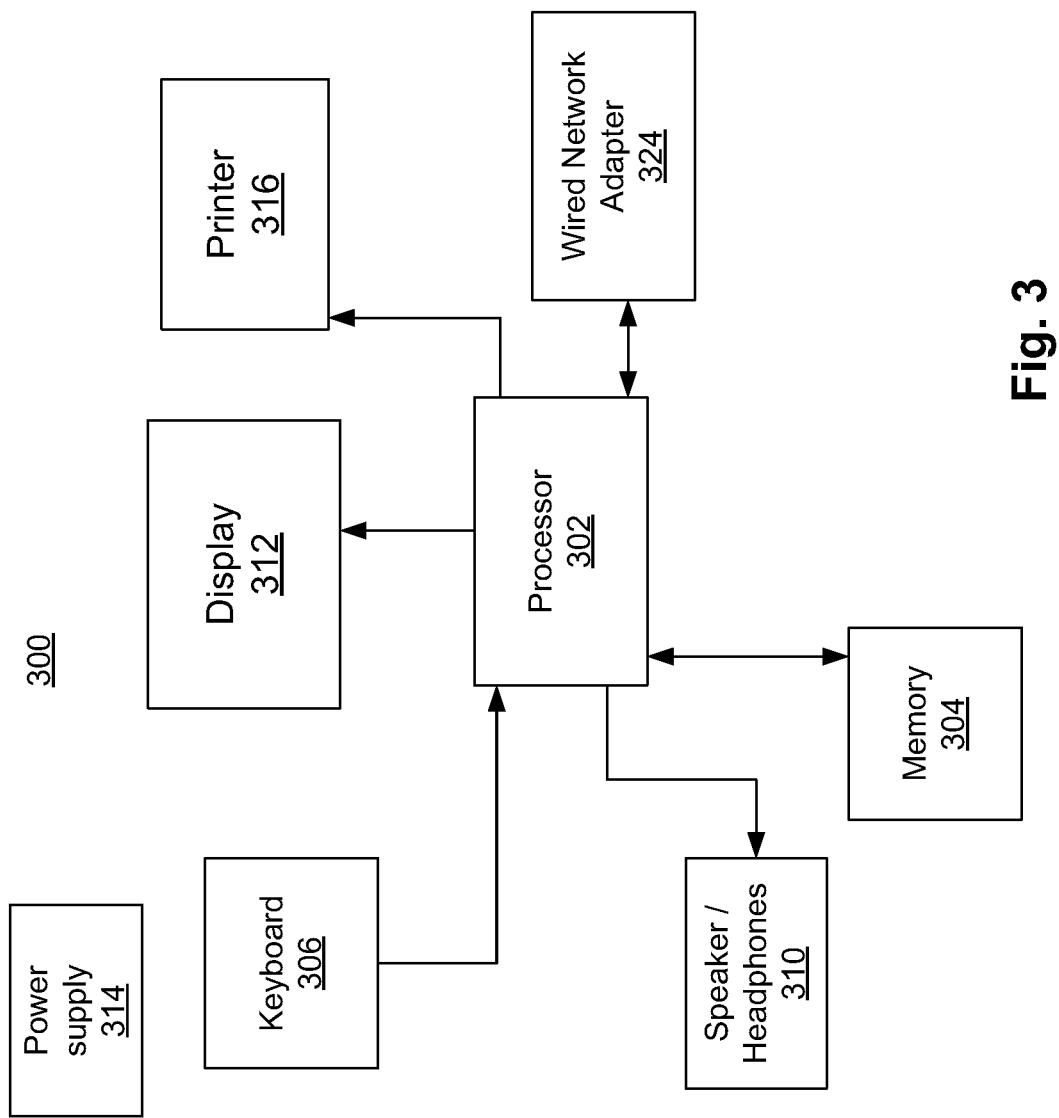
FIG. 3 shows an architecture of a offsite server computer system that may be used to implement various parts of the invention.

The components of the server 120 of the present embodiment are shown in FIG. 3. The server 120 has a processor 302 executing instructions from volatile and/or non-volatile memory 304 and storing data thereto. The server 120 may or may not have a keyboard 306, speaker 310, display 312 and/or printer 316. If the server 120 lacks these interfaces, the administrator would login to the server remotely and the server 120 would provide these interfaces to the administrator over the network 150. The server 120 communicates over the Internet 150 using the wired network adapter 324, such as an Ethernet adapter, to exchange information with the portable device 200.

A traffic data collecting application facilitates the recording, storage and transmission of traffic information comprising both the volume and classification of vehicular traffic flow and the volume and classification of pedestrian traffic flow through a given set of coordinates in a given time period.

Figure 4:
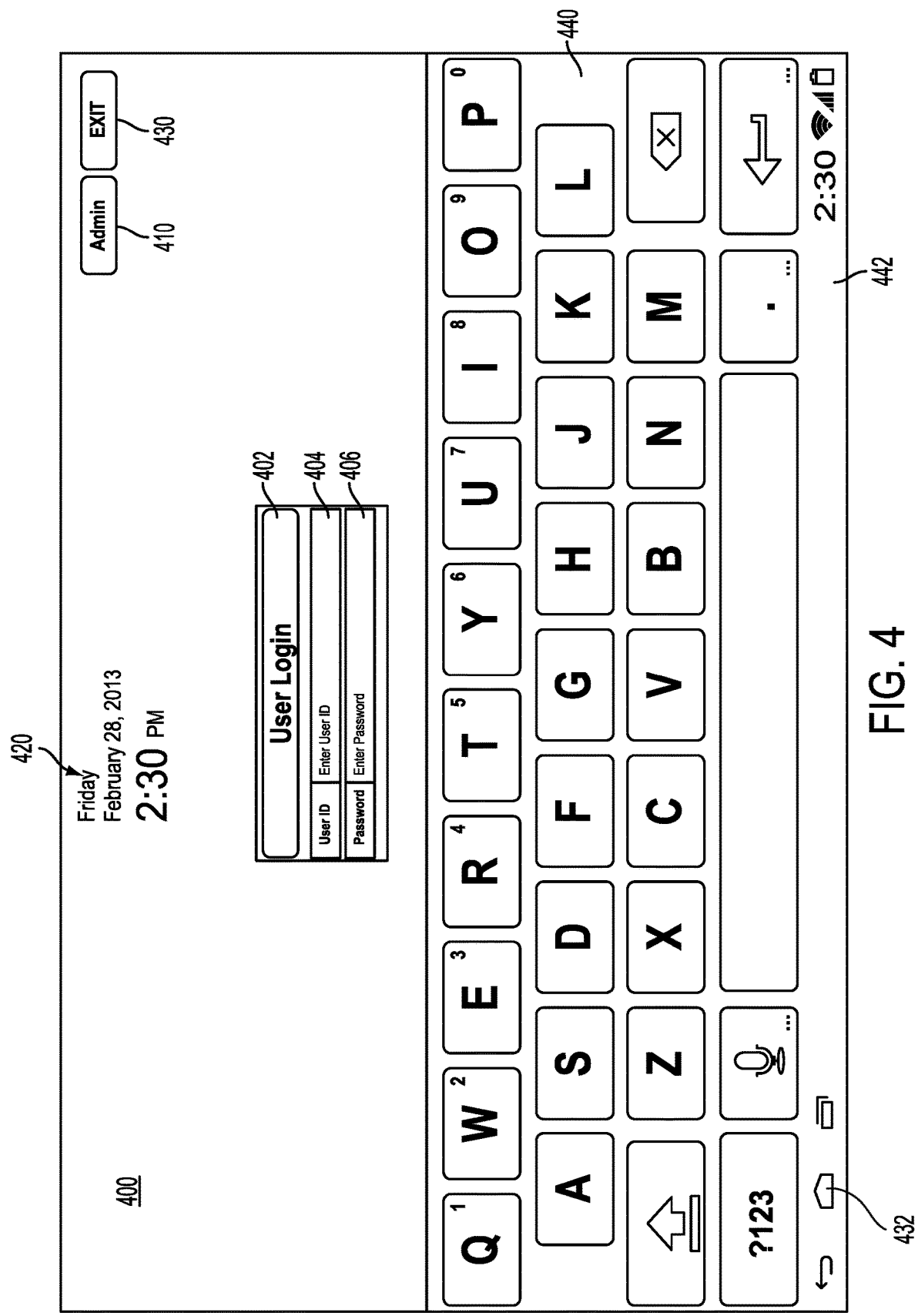
FIG. 4 shows screen capture of a login screen of a traffic flow monitoring application.

The Login Screen 400 shown in FIG. 4 is the initial startup screen for the traffic data collecting application and initiates the process of securely logging into the application in one of two Login Modes: User and Administrator. The User Login allows the user to gain access to the Data Collecting Process while the Administrator Login gives a verified Administrator the ability to login locally or via a remote session to perform any Administrative Functions on the portable device 200. The Login Screen 400 initializes with the default User Login prompt 402 displayed that accepts a user identifier (ID) 404 and password 406. Each user may be given a unique User ID and Password which may be contained in a preprogrammed database either internal to the portable device 200 or on the offsite server 120. Approximately half of the screen is an on-screen keyboard (OSK) 440 and status bar 442. The OSK 440 may optionally be hidden from view until the user has tapped in either the user ID field 402 or the password field 406.

The user enters their User ID and Password into the provided fields 404 and 406 using the OSK 440. The application validates the user login data against a list of authorized users and passwords in the preprogrammed database. If the User ID and Password matches the Home Screen 500 (discussed further below with reference to FIGS. 5A and 5B) is displayed. If the user login data does not match any entries in the preprogrammed database, the application clears the input fields and screen displays an error message such as "Error! You have entered and invalid User ID or Password. Please try again or EXIT." The user repeats the login process until their User ID and Password matches or they choose to Exit the application. Optionally, after a certain number of tries, the application locks the device and prohibits further access until it has been released by an Administrator or after a predetermined period of time has passed.

When the Admin Button 410 is selected the application calls an Admin Logon Screen similar to the User Login screen 400. The Administrators may be given a unique Administrator ID and Password which may be contained in the preprogrammed database. The Admin Login allows the Administrator's access to the maintenance functions of the application. These functions include, but are not be limited to, such procedures as uploading preconfigured database information, changing of Administrator identifiers, User identifiers and Passwords and Job Information specifications. It also allows the Administrator to download, modify or delete any database information along with performing backups and remote retrieval of data. The Administrator may also disable features such as the counter "reset" function. When disabled, the counters increase incrementally until the application closes. The Administrator may also enable or disable error monitoring for debugging purposes. The Backup Function and Send Data Function used in the Admin Function may also be incorporated into Backup and Send Data Functions called by the buttons on the Home Screen. The Admin Function may also have a feature that permits the Administrators to initiate the application and operate it as a user. In an alternative embodiment, the Administrator logs in using the User Login username field 404 and password field 406 and the Admin button 401 is not present.

Both the User and Admin Login screens 400 have a clock section 420 that displays the current date and time as well as the corporate logo.

When the Exit button 430 is pressed, an Exit dialog is displayed with a message such as "Are you sure?" with "Yes" and "No" as options. All other inputs are prohibited while Exit dialog is displayed until the Yes or No buttons have been selected. When "Yes" is pressed the application closes and returns to the operating system running on the portable device 200. Or optionally, the portable device 200 powers off. The Exit Button 430 may be available to the user at any time during the operation of the application. When "No" is pressed, the application returns to the previous screen state. Alternatively, the Home button 432 may be used to exit the application.

Figure 5A:
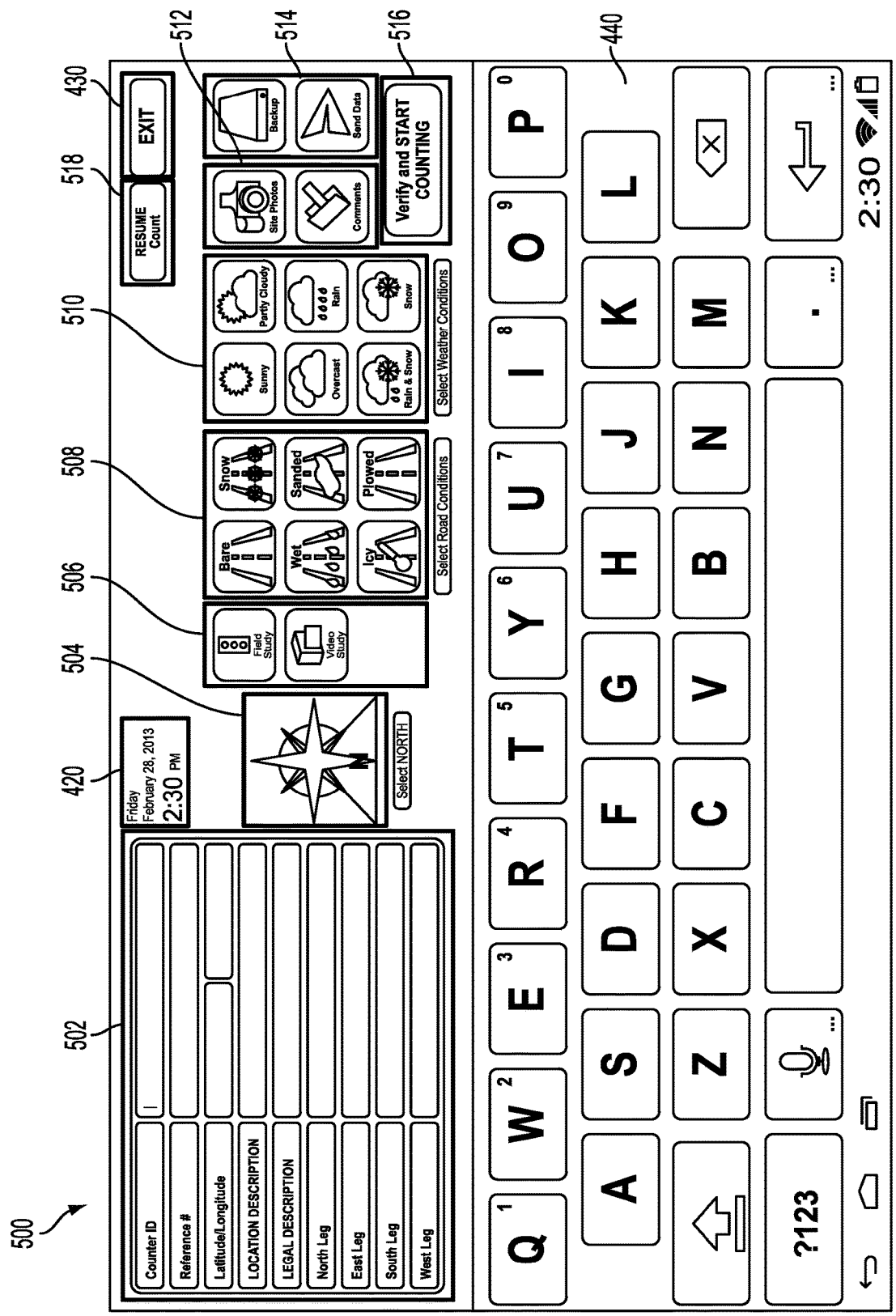
FIGS. 5A and 5B show a layout diagram and screen capture of a home screen of the traffic flow monitoring application.
Figure 5B:
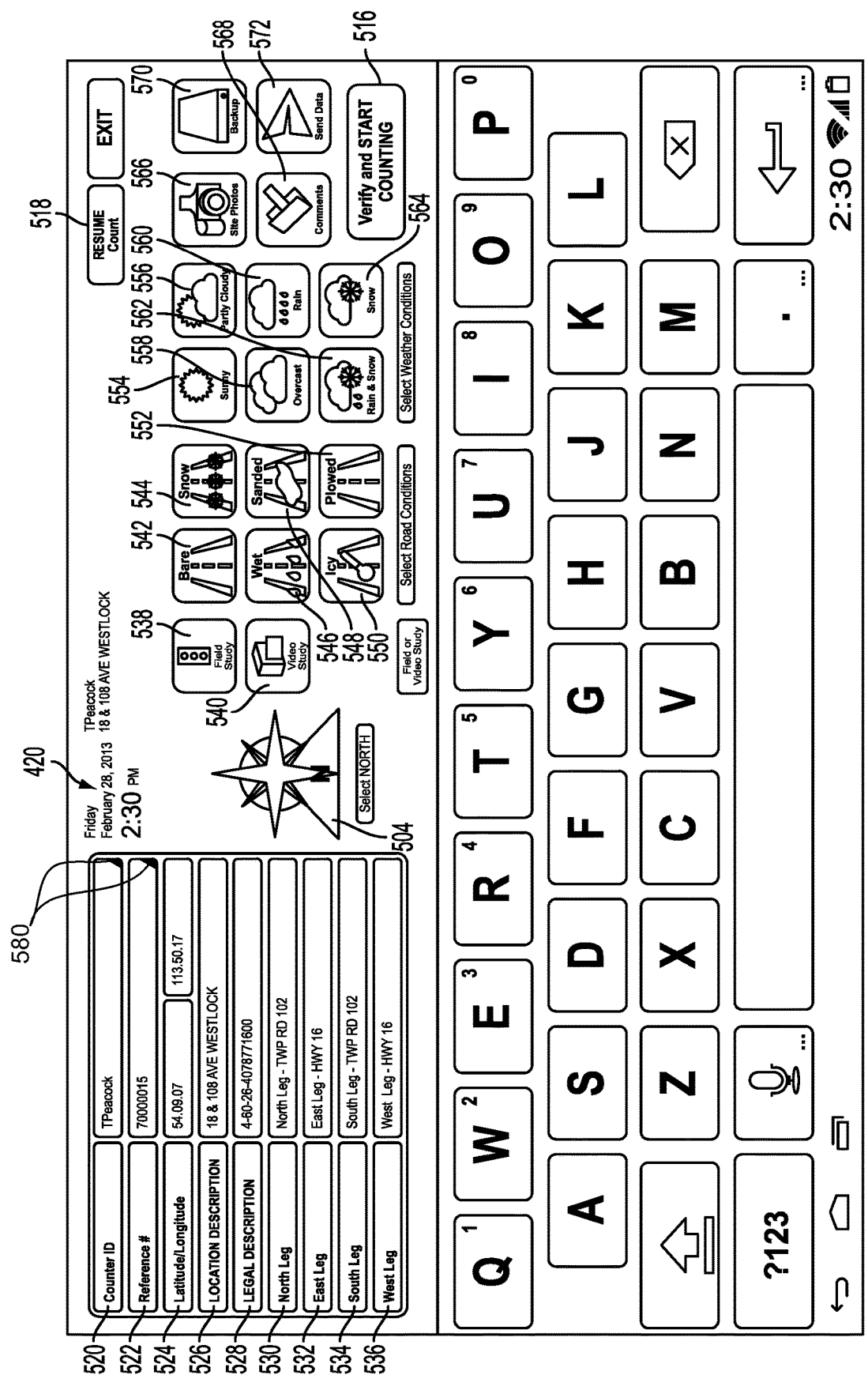
Figure 6:
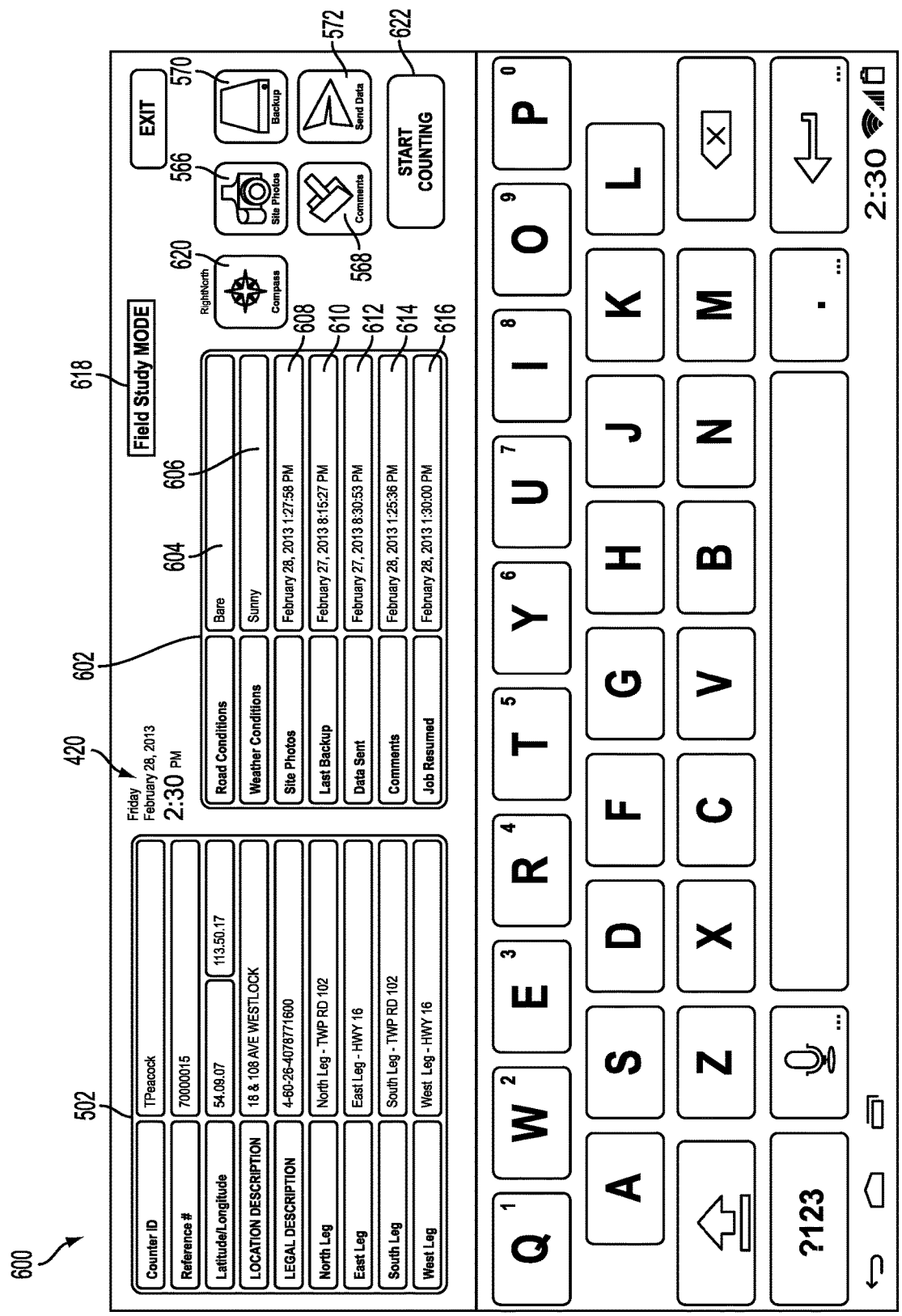
FIG. 6 show a screen capture of a verification screen of the traffic flow monitoring application.
Figure 7A:
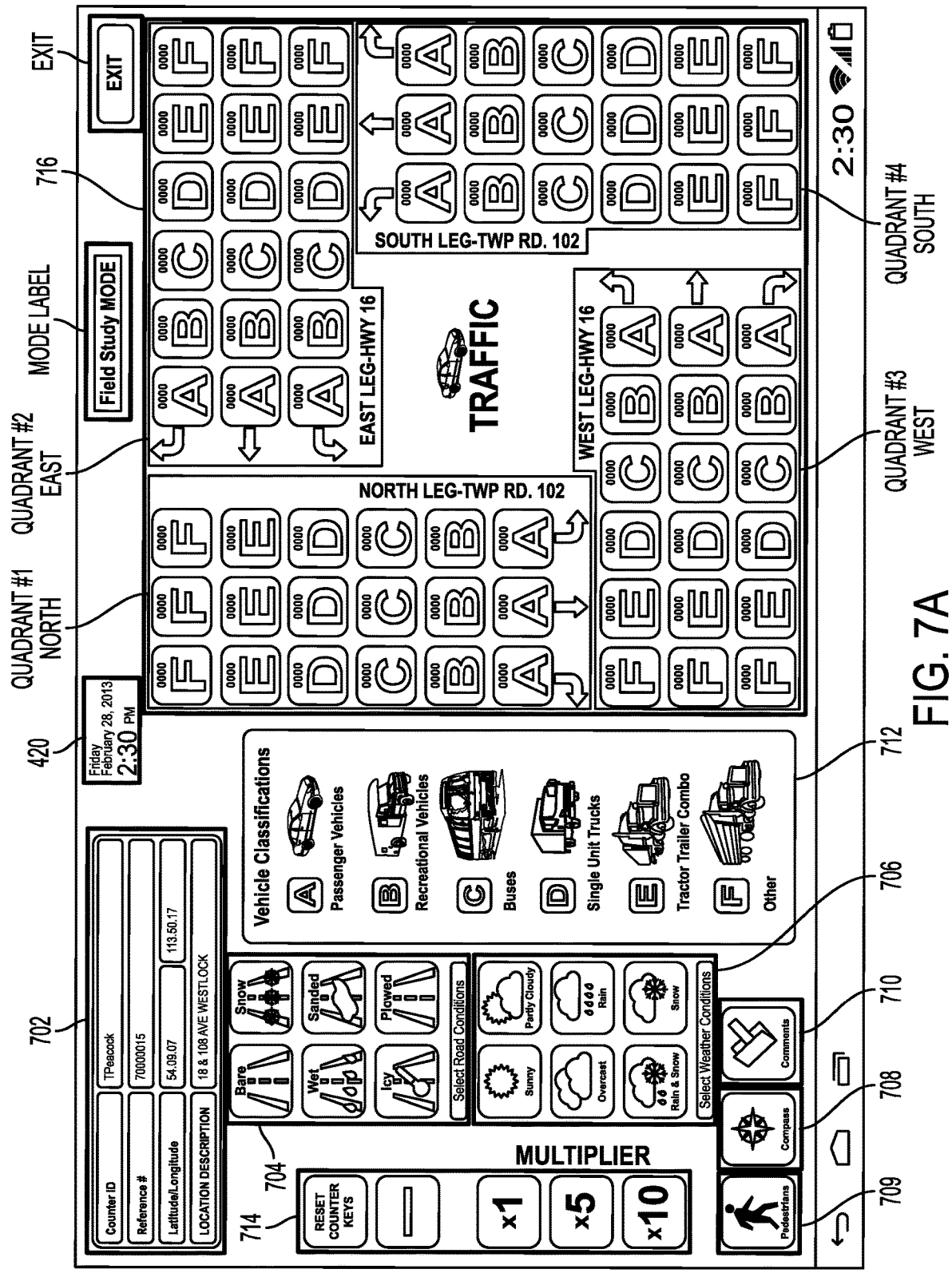
FIGS. 7A and 7B show a layout diagram and screen capture of a traffic data collection screen.
Figure 7B:
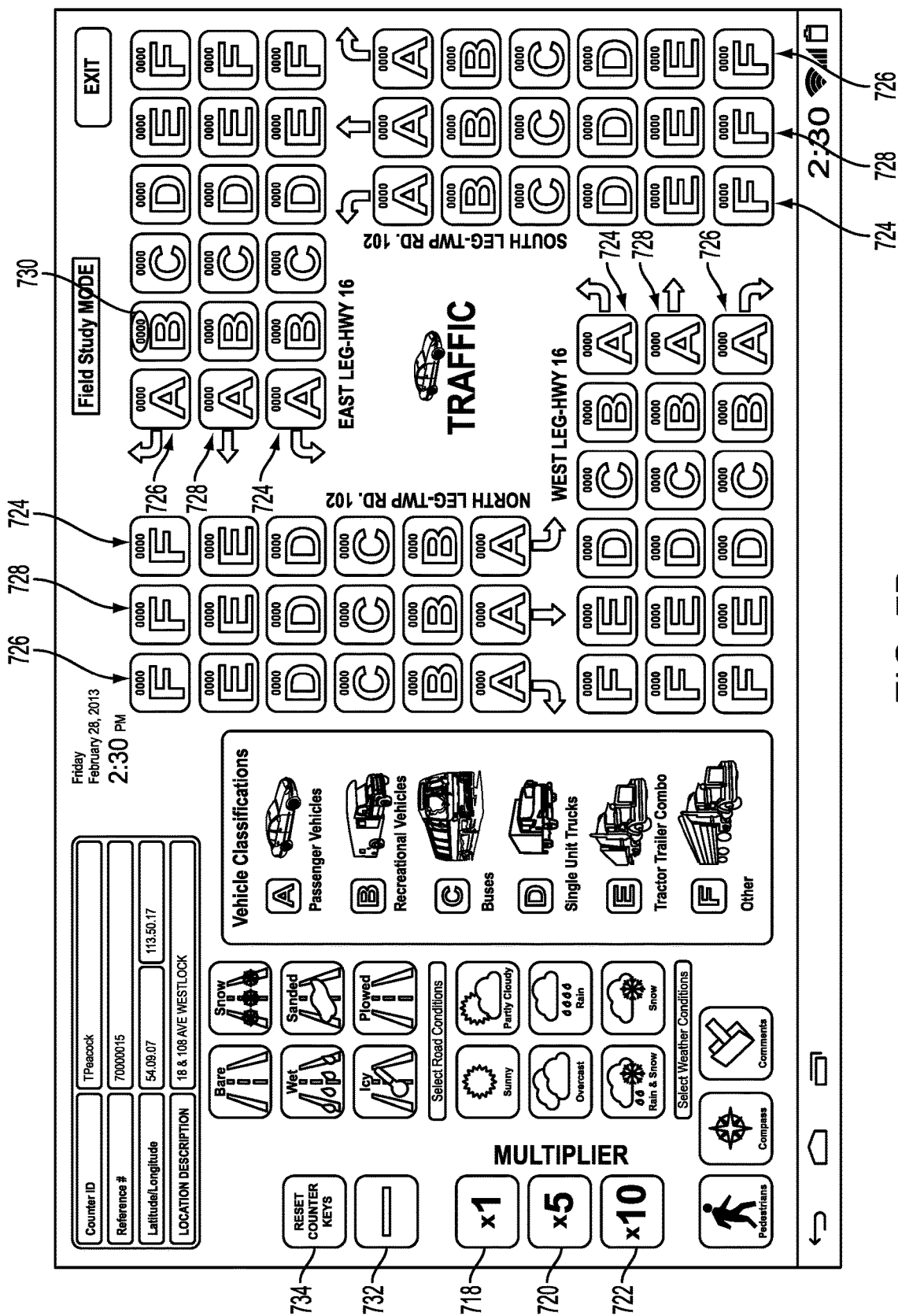
Figure 7C:
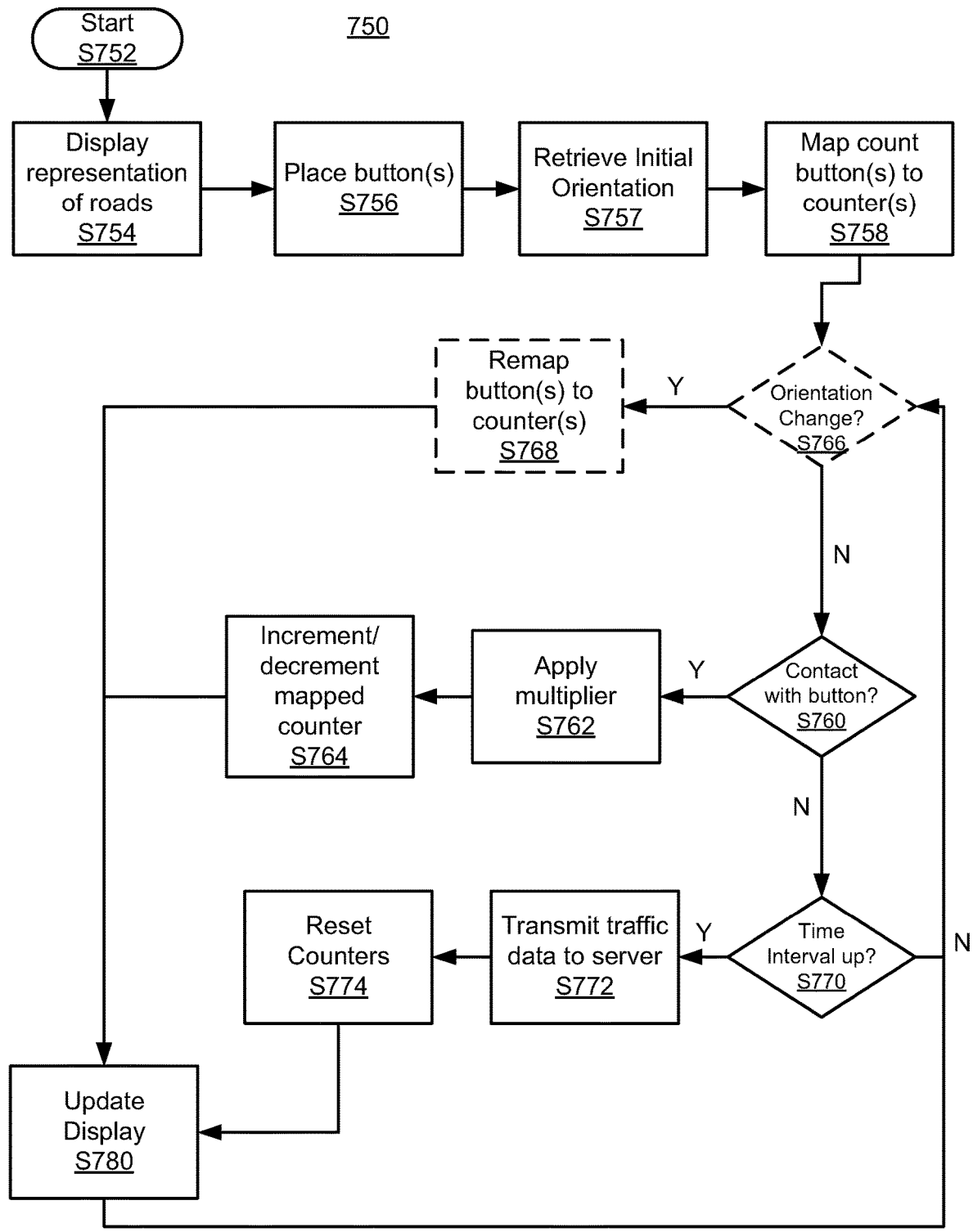
FIG. 7C shows a basic flowchart of a traffic flow monitoring application.

After successful user login the application displays the Home Screen 500 shown in FIGS. 5A and 5B. The Home Screen may initialize with a default of no job settings. The Home Screen 500 permits the user to input Job Information and Conditions. The Home Screen 500 is broken into several different regions: Job Information 502; Select North 504; Select Mode 506; Select Road Conditions 508; Select Weather Condition 510; Job Extras 512; Data transmission 514; Verification and Start 516; and Resume Count button 518 and Exit button 430. Approximately half of the display may be an OSK 440.

The Job Information 502 region permits entry of information specific to the particular job the user is about to perform. The fields are Counter ID 520, Reference Number 522, Latitude/Longitude 524, Location Description 526, Legal Description 528, and the names of the streets at the intersection for the North Leg 530, East Leg 532, South Leg 534, and West Leg 536. The cursor may initially be positioned in the Counter ID field 520 or alternatively a search field (not shown). The user can begin the process of inputting the Job Information 502, which may be recorded to a new unique ID or as a record in a pre-existing database. At any time during the entry of the Job Information 502, the user may select any input field and re-enter data. When any of the fields in the Job Information 502 region are selected, other information inputs are locked with exception of Resume Count 518, if available, and Exit 430.

Once the data has been entered by the user, a Job Information Function facilitates recording of the alphanumeric data into the database. When completed the Job Information Function unlocks the other information inputs and remains available in case the user needs to re-enter data into the Job Information 502 section. If user selects any of the fields in the Job Information 502 section the application calls the Job Information Function again. All unmodified information contained in the Job Information 502 fields remains the same.

Alternatively, the Job Information function may load the Job Information 502 from a preexisting database. The database may be preprogrammed with some or all of the Job Information 502 parameters such as a Counter ID 520, Reference Number 522, Latitude/Longitude 524, Location Description 526 and Legal Description 528. The data posted to these fields may be triggered by the user's input of a preexisting reference number into the Reference Number 522 textbox and based on the availability of data in the database corresponding to the other fields. The Job Information 502 region may also have a search field (not shown) that permits the user to search a job database (stored locally on the tablet 104 or remotely on the server 120) for a particular job. Alternatively or in addition to the search field, one or more of the fields may also have a spinner button 580 that allow for quick population of the field with previously entered data. On selection of the spinner button 580, a list of recently entered or recently selected data is displayed whereby the user may select a radio button to populate the associated field with the data. If any or all of the database fields contain no data then the Job Information Function records the inputted data input by the user and then positions the cursor in the first empty field to await further input.

The fields of the Job Information 502 region is as follows:

Counter ID 520 corresponds to the user id of the person who is currently taking the data. The Counter ID 520 field allows input of text or numbers into the text input Field ID:CounterID. The data entered in this field is stored in the database Field ID:CounterID. This field may be automatically retrieved from the User ID 404 entered by the user during login.

Reference Number 522 corresponds to the reference number for the traffic study. The Reference Number 422 textbox allows input of numbers into the masked text Field ID:Reference. The data entered in this field triggers a query for data stored in the database using the Field ID:Reference. If the input matches an existing entry in the database Field ID:Reference then the application attempts to populate the Latitude/Longitude 524, Location Description 526 and Legal Description 528 textboxes using the data from their corresponding database fields. The data entered in this field is stored in the database Field ID:Reference.

Latitude/Longitude 524 corresponds to the GPS coordinates for the intersection being studied. The Latitude/Longitude fields allow the input of numeric data into the masked text input Field ID:Latitude/Field ID:Longitude. The data entered in this field is stored in the database Field ID:Latitude/Field ID:Longitude. Optionally, the Latitude/Longitude 524 may be retrieved from the GPS/Orientation Sensor 218 of the portable device 200. The GPS coordinates may be determined at the beginning of the traffic study, time stamped and attached to the database enabling verification that the traffic study was conducted at the correct location and started on time improving the accuracy of the data collection.

Location Description 526 corresponds to a human readable description of the intersection such as $18^{th}$ and 108 Avenue, Westlock. The Location Description 526 field allows the input of alphanumeric data into the masked text input Field ID:Location. The data entered in this field is stored in the database Field ID:Location.

Legal Description 528 corresponds to the geographical location of the traffic study based on jurisdictions. Legal Land Descriptions are typically based on a grid network dividing the province or state into near equal-sized parcels of land known by various names such as, but not limited to, townships, sections, lots, metes and bounds, aliquots. The legal land description is a section of coordinates that help to locate a specific ground location. An example may be the Alberta Township Survey (ATS) System. Legal Description 528 field allows the input of alpha or numeric data into the masked text input Field ID:Legal. The data entered in this field is stored in the database Field ID:Legal.

North Leg 530 corresponds to a human readable description of the north leg of the intersection such as "North Leg—TWP RD 102". The North Leg 530 field allows the input of numeric data into the masked text input Field ID:NorthLeg. The data entered in this field is stored in the database Field ID:NorthLeg.

East Leg 532 corresponds to a human readable description of the east leg of the intersection such as "East Leg—HWY 16". The East Leg 532 field allows the input of alpha or numeric data into the masked text input Field ID:EastLeg. The data entered in this field is stored in the database Field ID:EastLeg.

South Leg 534 corresponds to a human readable description of the south leg of the intersection such as "South Leg—TWP RD 102". The South Leg 534 field allows the input of alpha or numeric data into the masked text input Field ID:SouthLeg. The data entered in this field is stored in the database Field ID:SouthLeg.

West Leg 536 corresponds to a human readable description of the west leg of the intersection such as "West Leg—HWY 16". The West Leg 536 field allows the input of alpha or numeric data into the masked text input Field ID:WestLeg. The data entered in this field is stored in the database Field ID:WestLeg.

Once the Job Information 502 has been entered or retrieved, the Counter ID 520 and/or Location Description 526 may be displayed next to the Clock 420. Optionally, in order to save screen space, one or more of the fields in the Job Information 502 region may not be displayed such as for example, the Legal Description 526, and/or the Cardinal Leg fields 530, 532, 534, and 536.

The Select North 504 Orientation button sets the orientation of North with respect to the portable device 200. Since the user has no way of predicting the exact position where the traffic and pedestrian flows will be observed, the orientation of North is used in order for the application to remap the Counting Keys or Data Collection Buttons 716 and 916, as further described below, according to the selected North orientation. By default all the Counting Keys 716 and 916 have an orientation of North Up on the portable device 200 since the application has a default landscape orientation which does not rotate. This remapping improves usability and reduces data input errors when recording the traffic flow while ensuring that the data is automatically recorded into the correct database fields. How each selection of North in this section effects the Traffic counting keys 716 and Pedestrian counting keys 916 as further detailed below with reference to FIGS. 7A to 10D in the sections containing the Traffic screen 700 and Pedestrian screen 900. Although the user may manually set the orientation of North, alternatively, the application may read the orientation from the GPS/Orientation sensor 218 and automatically select the proper orientation of North. The selection may be precise or may use a threshold to determine when remapping should occur. For example, if North is within 15-degrees of "East" on the portable device 200, then North may be remapped to "East" on the portable device 200 (and all other corresponding directions remapped accordingly). The orientation may be set during a calibration period where the user is asked to hold the portable device 200 in a steady position. After calibration, the orientation is fixed until another calibration is required by the user. This prevents inadvertent orientation changes while the user is operating the portable device 200. When the selection is made, either automatically or by user input, the North Orientation is recorded to the database Field ID:SelectNorth.

Select Mode 506 region contains two buttons Field Study 538 and Video Study 540. The application has the ability to operate in two modes: a Field Study Mode and Video Study Mode. Video Study Mode is used when the user observes pre-recorded video in order to determine the traffic flow. The pre-recorded video may be played on another computer system, VCR, DVD, in a small window on the portable device 200 or other video display devices known in the art. Furthermore, the pre-recorded video may be streamed from the portable device 200 to an external display over the wireless network or may be streamed from the server 120 at the request of the application executing on the portable device 200. In one example, only a single button for the Field Study 538 and Video Study 540 is presented in a toggle fashion.

In Video Study mode 540, the user may manually enter the start date and time of the actual start time and date of the video or the start date and time may be retrieved from the metadata of the video file or stream. Pausing the video may automatically stop the clock 420 on the portable device 200 from counting. Stopping the clock 420 on the portable device 200 may stop the streaming or playback of the video on the external device. In Field Study Mode 538, the user is observing a live stream of video or may be on-site observing traffic. In this mode, the date and time are retrieved from the clock 420 in the portable device 200.

Select Road Conditions 508 allows the user to enter the road conditions which are recorded in the database. In this embodiment, the initial road conditions may be selected from Bare 542, Snow Covered 544, Wet 546, Sanded 548, Icy 550, and Plowed 552 although other conditions may be specified as is know in the art. Optionally, the road conditions may be automatically retrieved over the Internet 150 from a weather forecasting website or from the Department of Highways website. In an alternative example, a single Road Conditions button may be displayed whereby selecting the button may display all of the road condition buttons as described above.

Select Weather Condition 510 allows the user to enter the initial weather conditions. In this embodiment, the initial weather conditions may be selected from Sunny 554, Partly Cloudy 556, Overcast 558, Rain 560, Rain & Snow 562, or Snow 564 although other conditions may be specified as is known in the art. Optionally, the weather conditions may be retrieved automatically over the Internet 150 from a weather forecasting service such as AccuWeather®, The Weather Network®, etc. In an alternative example, a single Weather Conditions button may be displayed whereby selecting the button may display all of the weather condition buttons as described above.

Job Extras 512 allows the user to take site photographs 566 and make comments 568 on the study. These photographs and notes are linked to the Job Information 502 and stored in the database. The Site Photos Function is an optional feature and uses the camera 208 of the portable device 200 to take photos of the job site and store the photographic data to a media folder created by application. When the Photo button 566 is pressed the application calls the Photo Function of the portable device 200. The photo interface used by the application is typically the one normally used by the operating system of portable device 200. The application then links the media folder to the current working or saved database. The Site Photos Function posts the Date and Time the photographs were taken to the database Field ID:Photos. If there are no current photos in the job's database when the Verification or Validation Screen 600 is called, the Site Photograph 566 button is displayed in its "Off" state and the Display Field ID:Photos is blank.

The Comments 568 Function allows the user to document any particulars about the current job site. The comments are written to a text file and then stored in memory 204 to a media folder created by application. The present embodiment proposes a maximum of 512 characters for comments. The file or folder created is then be linked to the current working or saved database. The Comments 568 Function posts the Date and Time of the comments to the database Field ID:Comments. This function is available to the user on the Home Screen 500, Validation Screen 600, Traffic Data Collection Screens 700 and Pedestrian Data Collection Screens 900 ensuring comments may be made at any time. If the Comments 568 Function is canceled the application returns to the last completed and saved state. Alternatively, the comments may be stored directly to the database without using a text file.

The Data transmission 514 section has two buttons: the Backup Button 570 and the Send Data 572 buttons. The Backup Button 570 allows the user to manually call the Backup Function. The Backup Function, when activated by the Backup Button 570, contains a routine that saves data (such as the database, the comments and the photographs) to a backup partition, SD Card or an external device such as an attached USB Hard Drive. The Backup Function may also be called automatically at a predetermined time such as every 5 or 15 minutes in order to retain the current state of the application should the application or portable device 200 fail during operation. Alternatively, the data may be written to the onboard database in real-time so that should the portable device 200 fail, the data would be present within the database file in the memory 204 of the portable device 200.

The Send Data Button 572, when manually selected by the user, calls the Send Data Function. If there is no current database available the Send Data Button 572 is displayed in its "Off" state. If there is a current database the Send Data Button 572 is displayed in its "On" state. The Send Data Function may be called manually from the Home Screen 500 and the Validation Screen 600. The Send Data Function contains a routine that transmits the data saved to a backup partition, SD Card or an external device such as an attached USB Hard Drive to be transmitted to an offsite server 120. The Send Data Function accesses the saved jobs and transmits the database, site photos and comments to the offsite server 120. It also may run a verification routine to ensure that the data has been transmitted and received by verifying a hash or other code generated from the data. The Send Function prompts the user to select and delete from the backup partition, SD Card, or external device any completed Traffic database that has been flagged as successfully being transmitted and/or backed up. The Send Data Function may also be called automatically at a predetermined time such as every 5 or 15 minutes in order to retain the current state of the application on the offsite server 120 should the application or portable device 200 fail during operation. This predetermined time may be the same or different than for the Backup function and a suitable time would typically be determined based on battery life of the portable device 200 and expense of transmitting information over the communication channel to the wireless access point 110.

Similar to the Login Screen 400, the Home Screen 500 has an Exit button 430 which operates as previously described. The Home Screen 500 also has a clock section 420 that displays the current date and time as well as the corporate logo. Next to the clock section 420 is the Counter ID 520 and/or Location Description 526.

The Resume Count button 518 is displayed on the Home Screen 500 and is inactive (or alternatively hidden) unless the user had been previously working on a database. The Resume Count button 518 is intended to allow the user to quickly pick up the study at a point where they left off. For example, if the user must quit for the day, then the following day, the user does not wish to re-type all the Job Information 502. When the Resume Count button 518 is pressed the screen dims and displays the Resume Count prompt such as: "You have chosen to resume your last count. Are you sure? Yes or No." All other inputs are locked until the Resume Count prompt has been confirmed or canceled. If "Yes" is pressed the Resume Count Function loads the last settings saved when the application was exited. When the Resume Count Function is used and the Validation Screen 600 process is complete, the application displays the Traffic Data Collection Screen 700. The Traffic Counting Function zeros out the Counting Key Volumes and any Counting Key Modifiers (as well as previous orientation) from the previous job are reapplied.

If "No" is pressed the Resume Count Function closes and places the cursor in Field ID:CounterID and waits for input. The Resume Count Function remains active and available until the user begins input into different Job Information 502 at which time the Resume Count button 518 is disabled or disappears from the screen causing the Resume Count Function to be no longer be available. The function and Resume Count button 518 is enabled again upon exiting and restarting the application.

The Verify and Start Counting button 516 calls the Validation Function that evaluates all the fields of the Job Information 502 to ensure accuracy and also verifies that Select North 504, Study Mode 506, Road Conditions 508, and Weather Conditions 510 have been selected. The Validation Screen 600 allows for user input into the database but is meant to act as a last check for entry errors and omissions. If any of the information is inaccurate or incomplete, a dialog is presented to the user indicating the deficient selection. When the Verify and Start Counting button 516 is pressed on the Home Screen 500 and all fields are accurate, all fields are saved and the Validation Screen 600 is displayed.

The Validation Screen 600 contains all the Job Information 502 from the Home Screen 500 for review by the user to ensure accuracy. The details of which were described above and thus will not be discussed further here. If no site photographs or comments have been made, the corresponding buttons 566, 568 activate the comment or photo capabilities of the portable device 200 where the comments and photos are time stamped and stored in fields 608 and 614. A data status 602 region displays the information that was entered on the Home Screen 500 listing the Road Conditions 604, Weather Conditions 606, and last modified dates of Site Photos 608, Last Backup 610, Data Sent 612 (to offsite server 120), Comments 614, and when the Last Job 616 was made. The Mode Label Section 618 displays the current Mode in which the application is running to act as a visual cue for the user. The Compass 620 indicates the direction of North. If the data has not been backed up, the Backup Button 570 is enabled. If the Backup Button 570 is selected by the user, the Backup Function is called. Once completed, the Validation Screen 600 reappears and displays the Backup Button 570 in its default "Off" state. If the data has not been sent to the offsite server 120, the Send Data Button 572 is enabled. If the Send Data Button 572 is selected by the user, the Send Data Function is called. Once completed, the Validation Screen 600 reappears and displays the Send Data Button 572 in its default "Off" state.

Once the user is satisfied with the state of the Validation Screen 600, the user selects the Start Counting 622 button. The application then proceeds (S752) to display the Traffic Data Collection Screen 700 (S754).

The application displays the representation of an intersection or other location (S754) and places buttons (S756) as is further disclosed below. The Traffic Data Collection Screen 700 is divided into a number of sections: Clock 420; Job Information 702; Select Road Conditions 704; Select Weather Conditions 706; Compass 708; Select Pedestrian Screen 709; Job Extras 710; Vehicle Classification 712; Key Counting Modifiers 714; and Counting Keys or Buttons 716. In order to improve clarity of the figures, not all of Counting Keys 716 are labeled individually. The Counting Keys 716 are placed proximal to the particular road with which they are associated. Field Mode study and Video Mode study present similar screens with similar functionality. One difference between the two is a label indicates the mode. Another difference is the Clock 720 displays the time of the study which may be the current time if it is a Field Mode study or it may display the time of the video if it is a Video Mode study. The Job Information 702 displays abbreviated information from the prior Job Information 502 screen. The Select Road Conditions 704, Select Weather Conditions 706, Compass 708, and Job Extras 710 are also as previously described and allow the user to update (along with time stamps) their information during the traffic study enabling tracking of the weather and road conditions throughout the day. In an alternative example, the Select Road Conditions 704, Select Weather Conditions 706, and Job Information 702 may not be displayed permitting the Counting Keys 716 to be placed to consume a large area of the display 212. The Select Pedestrian Button 709 changes the display to the Pedestrian Screen 900 further discussed below with reference to FIGS. 9A to 9C.

A Vehicle Classification legend 712 is shown that assigns a letter to each type of vehicle. For example, "A" correspond to passenger vehicles; "B" corresponds to recreational vehicles; "C" corresponds to buses; "D" corresponds to single unit trucks; "E" corresponds to Tractor Trailer Combos; and "F" corresponds to other types of vehicles like logging trucks. The Vehicle Classification legend 712 informs the user of which type of vehicle each lettered button in the Counting Keys 716 area corresponds. The user may also customize the Vehicle Classification legend 712 to a user-defined category by enabling the user to type a category name such as, for example, A:passenger; B:Single unit truck; C:Tractor Trailer; D:Bicycle; or E:Motorbike. In one example, up to 13 classifications may be entered in addition to bicycles. In another example, there may be more than 30 classifications. When there are large numbers of classifications, they may be shown as additional layers of buttons. The user may also be able to select a corresponding icon or image from a set of icons/images stored on the portable device 200.

The Key Counting Modifiers 714 has five buttons: Multiplier Keys (×1 718, ×5 720; and ×10 722), a Minus Key 732 and Reset Counter Keys 734. The Multiplier Keys ×1 718, ×5 720 and ×10 722 are used to set a default multiplier for each of the Counting Keys 716. Any or all the counting keys are available to be multiplied by any of the multiplier keys at any time during the counting process. In an alternative example, a single Modifier button is presented whereby selection of the Modifier button opens an interface with all the Multiplier Keys 718, 720, 722, 732, and 734.

For example, when the user selects the ×10 multiplier key 722 the screen displays a Multiplier prompt: "You are multiplying the count by ×10. Please select the key(s) to be multiplied. When finished press Done or select another multiplier." The user then selects one or all the counting key(s) 716 to be multiplied by the chosen multiplier selection. The multiplier allows the user to choose any other multiplier key during the process. The selection of a new multiplier value changes the "count by x #" displayed in the Multiplier prompt to the new multiplier selection and the new multiplier value is subsequently applied to any of the counting keys 716 selected after the change even if they have been programmed with a previous multiplier value. As each counting key 716 is pressed during the multiplier process the screen changes the affected counting key's display to show a green border or band surrounding the key indicating to the user that the key is in a multiplier mode. Alternatively, a small number indicating the multiplier in effect may be added to the counting key 716 such as 1×, 5×, or 10×. Any or all of the counting keys 716 are available to be multiplied by any of the multiplier numbers at any time during the counting process to facilitate easily changing of the multipliers in case of a significant increase or decrease in traffic flow from a particular direction. When "Done" is selected from the Multiplier prompt the prompt disappears from the Traffic Data Collection Screen 700 and the Traffic counting keys 716 are ready to input their new counting values into the corresponding database fields.

Similarly, when the user selects the ×5 multiplier key 720, the screen 700 displays a Multiplier prompt: "You are multiplying the count by ×5. Please select the key(s) to be multiplied. When finished press Done or select another multiplier." The user then selects one or all the counting key(s) 716 to be multiplied by the chosen multiplier selection. The multiplier allows the user to choose any other multiplier key during the process. The selection of a new multiplier value changes the "count by X #" displayed in the Multiplier prompt to the new multiplier selection and the new multiplier value is subsequently applied to any of the counting keys 716 selected after the change even if they have been programmed with a previous multiplier value. As each counting key 716 is pressed during the multiplier process the screen changes the affected counting key's display to show a blue band surrounding the key indicating to the user that the key 716 is in a ×5 multiplier mode. Alternatively, a small number indicating the multiplier in effect may be added to the counting key 716 such as 1×, 5×, or 10×. Any or all the counting keys 716 are available to be multiplied by any of the multiplier numbers at any time during the traffic data collection process. When "Done" is selected from the Multiplier prompt the prompt disappears from the Traffic Data Collection Screen 700 and the Traffic counting keys 716 are ready to input their new counting values into their corresponding database fields.

When the user selects the ×1 multiplier key 718, the screen 700 displays a Multiplier prompt: "You are multiplying the count by ×1. Please select the key(s) to be multiplied. When finished press Done or select another multiplier." The user then selects one or all the counting key(s) to be multiplied by the chosen multiplier selection. The multiplier allows the user to choose any other multiplier key during the process. The selection of a new multiplier value changes the "count by x #" displayed in the Multiplier prompt to the new multiplier selection and the new multiplier value is subsequently applied to any of the counting keys 716 selected after the change even if they have been programmed with a previous multiplier value. As each counting key is pressed during the multiplier process the screen changes the affected counting key's 716 display to show no band in indicating to the user that the counting key 716 is in ×1 multiplier mode. Alternatively, a small number indicating the multiplier in effect may be added to the counting key 716 such as 1×, 5×, or 10×. Any or all the counting keys 716 are available to be multiplied by any of the multiplier numbers at any time during the traffic data collection process. When "Done" is selected from the Multiplier Prompt the prompt will disappear, the Multiplier Buttons will return to their "Off" state appearance and the Traffic Counting keys 716 are ready to input their new Key Counting values into their corresponding database fields.

The ×1 Multiplier Key 718 is available as a multiplier is used to facilitate returning counting keys 716 to the default value of 1. As an example, the user has mistakenly multiplied an F-Class Counting Key 716 by ×10, they can use the ×1 to quickly reset this one counting key to its default value of 1 without have to reset all the counting key values.

The Minus Button 732, when selected, calls a Subtract Function that decrements an amount from a Traffic Counting Key 716 permitting the user to correct any Traffic Counting Key's 716 current volume totals in the database. The user has two options to subtract counting errors from the database. The first option is where the user may select one Traffic Counting Key 716 and the Subtract Function decrements one from the Current Key Volume 730 and the Key Volume Total (not shown). When the Subtract Function is complete the Minus Prompt clears from the screen and the application returns to its last state. The second option is where the user may select a Multiplier Key 718 to enable the Multiplier Function to subtract multiple errors from the database. When the user has finished programming the Traffic Counting Keys 716 to be subtracted and presses "Done" in the Multiplier Prompt the Subtract Function deletes the programmed Traffic Counting Keys 716 Current Volumes and the Keys Volume Totals. When the Subtract Function is complete the Minus Prompt and Multiplier Prompt clears from the screen and the application returns to its last state When pressed the Minus Button 732 displays a Subtract Prompt: "You have chosen to Subtract from a Counting Key 716. Press the Counting Key 716 to be subtracted or choose the multiplier for subtracting a different amount." The Minus Button 732 defaults to subtracting 1 from the value of the Counting Key 716. If no multiplier key 718, 720, 722 has been selected, once a Traffic Counting Key 716 has been pressed, the Subtract Function exits. The whole process needs to be restarted in order to subtract any further Key Counting Volumes. If the user selects "Cancel" from the Minus Prompt the application returns to its last state.

When a Multiplier Key (×1 718, ×5 720; and ×10 722) is selected following the Minus Button 732, the Traffic Counting Key 716 has the multiplied amount subtracted from the selected Traffic Counting Key 716. If the user selects a Multiplier Key 718, 720, 722, a prompt is displayed for multipliers and then the user selects the associated Traffic Counting Key 716 or Keys. Once the Traffic Counting Key(s) 716 have been selected and the user presses the Multipliers Prompt "Done", the Subtract Function decrements the multiplier amount from the selected Current Key Volume 730 and the Keys Volume Total (not shown) and turn off the Subtract Function. The whole process would need to be restarted in order to subtract any further Current Key Volumes 730.

The Reset Counter Keys 734 is selected, all of the Key Counting Modifiers applied to the Traffic Counting Keys 716 are reset back to the default count value of 1. When the Reset Counter Keys Button 734 is pressed the screen 700 displays the Reset Prompt: "You have chosen to Reset ALL your Counting Key(s) to their Default Value of ONE. Are you Sure? Yes or No." If the user selects "Yes", the Reset Counter Keys Function resets all of the Traffic Counting Key(s) values to their Default Count Value of 1 and the screen 700 displays the Traffic Counting Key(s) 716 in their "Off" state. If the user selects "No" the prompt closes and the application returns to the last state it was in prior to the Reset Counter Keys Function being called.

In the present embodiment, the Traffic Data Collection Screen 700 contains a total of 76 Traffic Counting Keys 716 to record vehicle traffic flow to a database. Each of the Counting Keys 716 may be modified using the aforementioned Key Counting Modifiers 718, 720, 722. When the Counting Function is active, each Counting Key 716 struck is recorded to a counter as a Current Key Volume 730 and uses the date and time displayed on the Clock 420 to generate a Time Stamp for the entries (S760). One set of buttons corresponds to a left turn 724, another set to a right turn 726, and another set to a straight 728 motion through the intersection. Each of the set of buttons has one key for each type of vehicle shown in the Vehicle Classification legend 712. When the user observes the particular type of vehicle travelling through the intersection, the user contacts the touch screen 206 in the appropriate button area. This contact applies the preselected multiplier (S762) and increments the counter for that particular button (S764). In Field Mode, the Clock 420 value is the current time and date. In Video Mode, the Clock 420 value will be the recorded time and date of the video. Each of the Counting Keys 716 has a counter display field on it showing the Current Key Volume 730 for the key which is updated after contact with the button (S780). This counter display 730 gives the user progress feedback and allow for visual error checking. As well as visual feedback, the application may provide audio feedback to the user in the form of an audible "click" when a Counting Key 716 has been pressed. Alternatively, a different audible sound may be made when a multiplier is used or the audible sound may be the sound emitted by the corresponding vehicle.

In use, the application divides the study period into 15 minute slices of time. At the end of each slice of time (S770), all the counts 730 on each of the Counting Keys 716 are recorded to the database with a time code (S772) and the Current Key Volume is zeroed for each of the Counting Keys 716 (S774) and the display is updated (S780). The process generally returns to S766 in an infinite loop until the user terminates it. Alternative embodiments may use slices of greater or less time, such as 5 minute increments, depending on how much traffic runs through the intersection during the study period and the desired resolution of the data. Traffic studies typically occur over a 12 hour period from 7 am to 7 pm but is dependent on the jurisdiction but some studies may only collect data at peak times of 7:30-9:30 am and 4:00-6:00 pm.

In the present embodiment, the Traffic Counting Keys 716 are divided into four quadrants generally referred to as Quadrant #1 (North), Quadrant #2 (East), Quadrant #3 (West), and Quadrant #4 (South) abbreviated herein as Q1 (N), Q2 (E), Q3 (W), Q4 (S) respectively. Each of the keys have been assigned a unique key identifier and unique display field identifier used to show the individual key's accumulated count while counting. Q1 N appears in the top portion of the display as the application, in this embodiment, may not be rotated. When the user is facing North, no remapping of the keys is necessary. However, when another north orientation is selected from the Select North 504 or 705, the Traffic Counting Keys 716 are remapped (S757 and S758) as demonstrated in FIG. 8 to facilitate the recording of the counting data into their correct fields in the database while maintaining ease of use by the user. Optionally, if the orientation changes (S766) during the traffic study, the buttons are remapped to the appropriate counters (S768).

Figure 8:
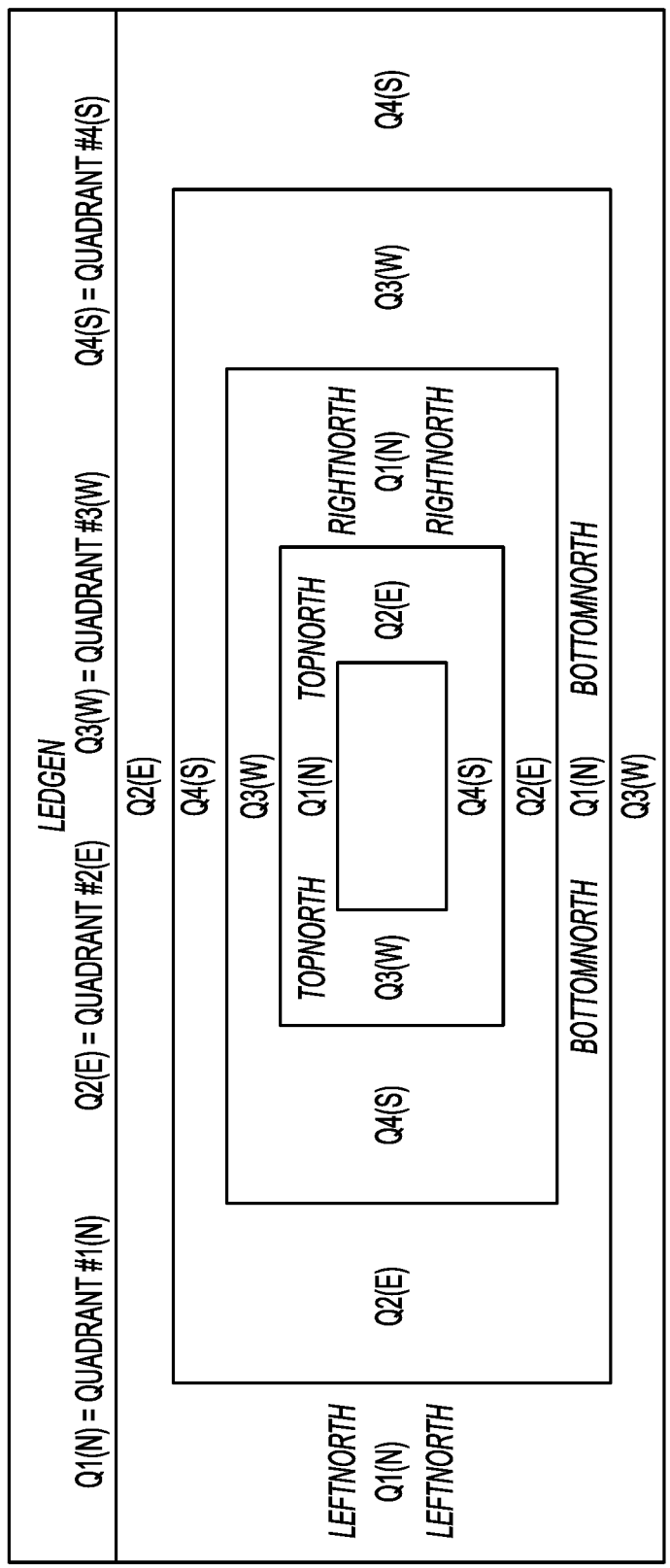
FIG. 8 shows a conceptual diagram of the mapping of the data collection keys of the traffic data collection screen.

When the user is facing West (e.g. North is in the user's Right direction, known as RightNorth in FIG. 8):

The Traffic Keys 716 in Quadrant #2 (E) are remapped to input the data as if were inputted from the Traffic Key Numbers 716 in Quadrant #1 (N). The Traffic Key Numbers 716 in Quadrant #3 (W) are remapped to input the data as if were inputted from the Traffic Key Numbers 716 in Quadrant #4 (S). The Traffic Key Numbers 716 in Quadrant #4 (S) are remapped to input the data as if were inputted from the Traffic Key Numbers 716 in Quadrant #2 (E). The Traffic Key Numbers 716 in Quadrant #1 (N) are remapped to input the data as if were inputted from the Traffic Key Numbers 716 in Quadrant #3 (S).

When the user is facing South (e.g. North is behind the user, known as BottomNorth in FIG. 8):

The Traffic Key Numbers 716 in Quadrant #4 (S) are remapped to input the data as if were inputted from the Traffic Key Numbers 716 in Quadrant #1 (N). The Traffic Key Numbers 716 in Quadrant #3 (W) are remapped to input the data as if were inputted from the Traffic Key Numbers 716 in Quadrant #2 (E). The Traffic Key Numbers 716 in Quadrant #1 (N) are remapped to input the data as if were inputted from the Traffic Key Numbers 716 in Quadrant #4 (S). The Traffic Key Numbers 716 in Quadrant #2 (E) are remapped to input the data as if were inputted from the Traffic Key Numbers 716 in Quadrant #3 (W).

When the user is facing East, (e.g. North is in the user's Left direction, known as LeftNorth in FIG. 8):

The Traffic Key Numbers 716 in Quadrant #3 (W) are remapped to input the data as if were inputted from the Traffic Key Numbers 716 in Quadrant #1 (N). The Traffic Key Numbers 716 in Quadrant #1 (N) are remapped to input the data as if were inputted from the Traffic Key Numbers 716 in Quadrant #2 (E). The Traffic Key Numbers 716 in Quadrant #2 (E) are remapped to input the data as if were inputted from the Traffic Key Numbers 716 in Quadrant #4 (S). The Traffic Key Numbers 716 in Quadrant #4 (S) are remapped to input the data as if were inputted from the Traffic Key Numbers 716 in Quadrant #3 (W).

Figure 9A:
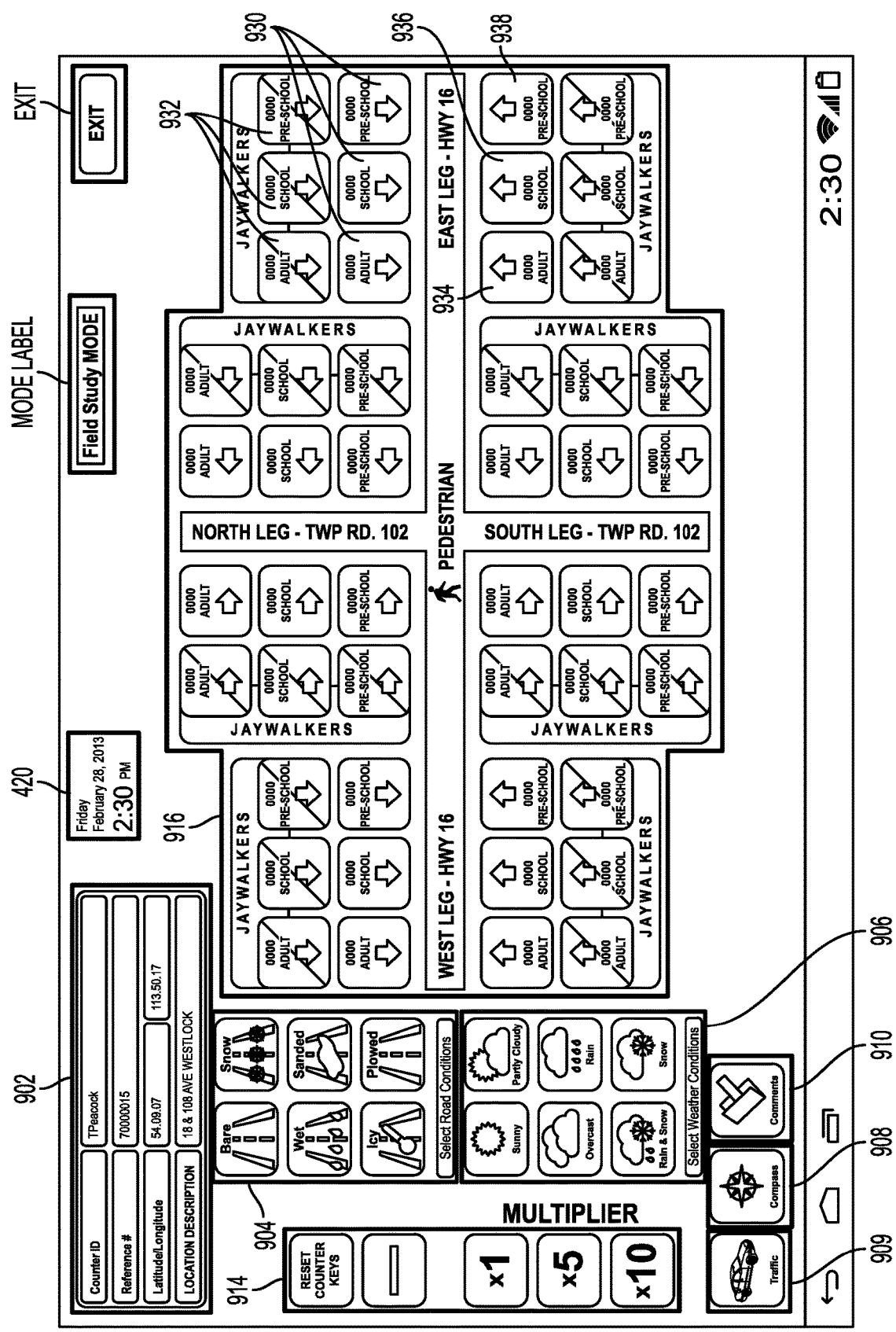
Figure 9B:
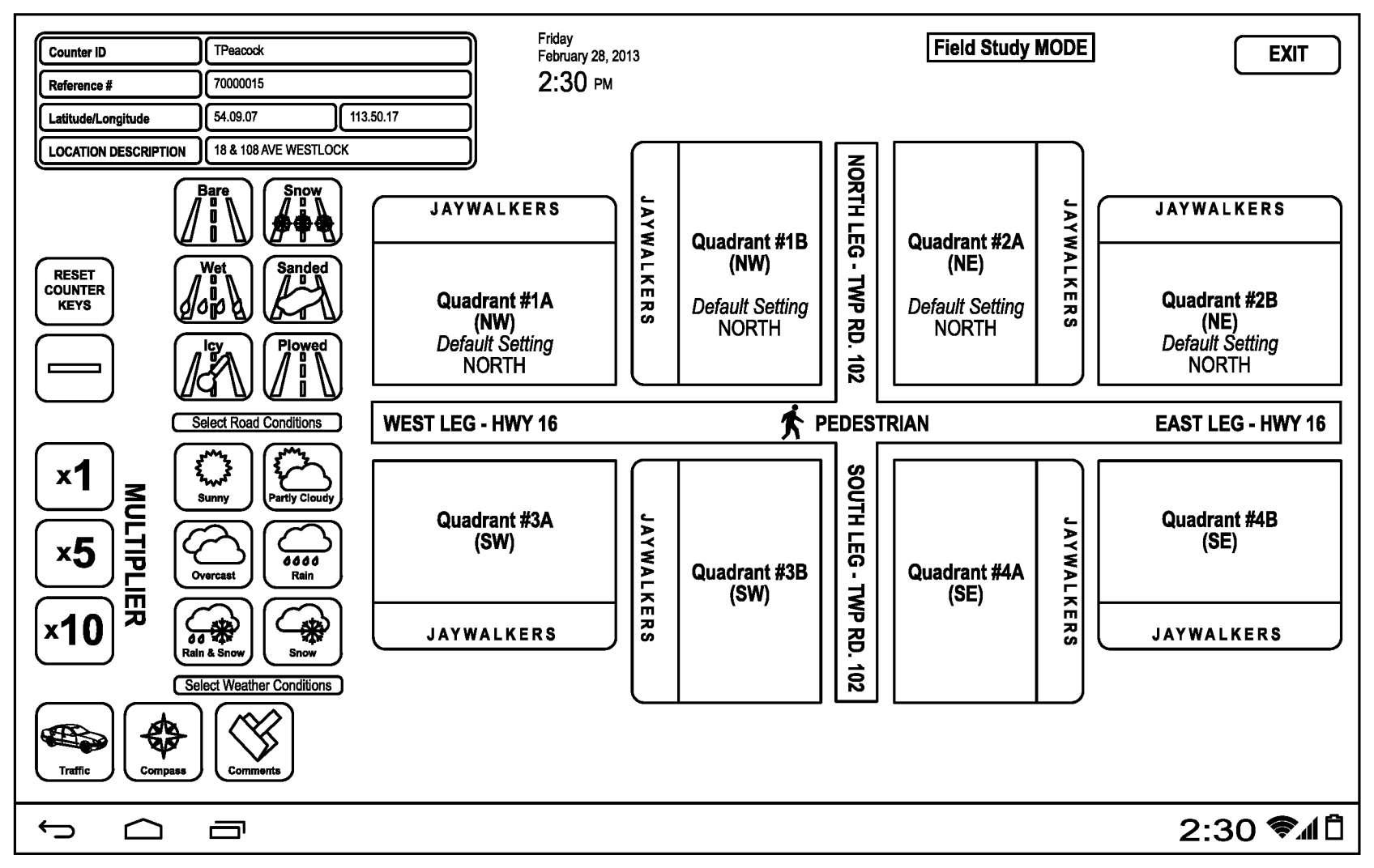
Figure 9C:
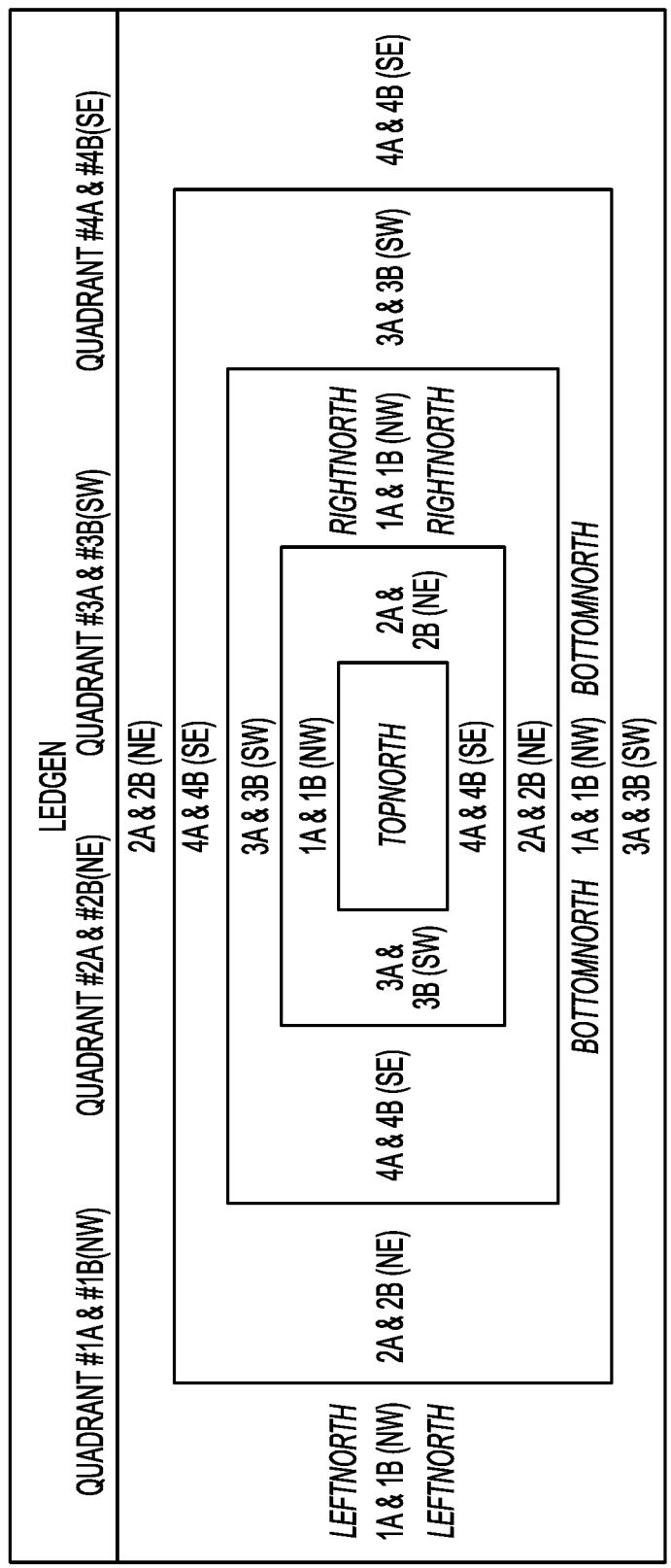
FIG. 9C shows a conceptual diagram of the mapping of the data collection keys of the pedestrian data collection screen.

When the Select Pedestrian Screen button 709 is selected by the user, the application saves all current Traffic Data Collection Settings and remains running in the background to facilitate a return, without interruption, to the Traffic Data Collection Screen 700 for resumption of vehicle counting. The portable device 200 saves all the information and state for the Traffic Screen 700 and displays the Pedestrian Screen 900 as shown in FIGS. 9A to 9C. The Pedestrian Data Collection Screen is called from the Pedestrian Button 709 on the Traffic Data Collection Screen 700 due to the fact vehicle Traffic Data Collection is more frequently accessed by the user of the application. Alternatives may have the Pedestrian Data Collection Screen 900 accessible from other screens.

The Pedestrian Data Collection Screen 900 is divided into a number of sections: Clock 420; Job Information 902; Select Road Conditions 904; Select Weather Conditions 906; Compass 908; Select Traffic Screen 909; Job Extras 910; Key Counting Modifiers 914; and Counting Keys 916. The Clock 420; Job Information 902; Select Road Conditions 904; Select Weather Conditions 906; Compass 908; Job Extras 910; and Key Counting Modifiers 914 are the same as described for the Traffic Screen 700 and thus are not be further described with reference to the Pedestrian Data Collection Screen 900. In an alternative example, the Job Information 902, Select Road Conditions 904 and Select Weather Conditions 906 may be shown as a single button that opens the respective panels with all of the associated options. The Select Traffic Screen button 909 changes the view back to the Traffic Screen 700. When the Select Traffic Screen button 909 is pressed the application saves all current Pedestrian Count Settings and Traffic Counting Screen 700 is displayed. The Pedestrian Counting Key Function remains running in the background to facilitate a return to the Pedestrian Data Collection Screen 900, without loss of Pedestrian Key Count Volumes and Key Count Volume Totals.

The Pedestrian Data Collection Screen 900 containing 48 Pedestrian Counting Keys 916. The Counting Keys 916 record pedestrian flows to a database with each of the Counting Keys 916 being modifiable using the Counting Modifier Keys 914 as previously described for the Traffic Screen 700. Again, to improve clarity of the figures, each of the Counting Keys 916 is not individually labeled. The layout of the Pedestrian Counting Keys 916 is different than for the Traffic Counting Keys 716 due to pedestrians being able to walk towards the intersection on either side of the road. Similar to the Traffic Counting Keys 716, the Pedestrian Counting Keys 916 are divided into quadrants as shown in FIG. 9B. There are four quadrants with each containing two sections A and B. The pedestrian buttons are divided into A and B as one section is corresponds to motion across the roadway in one direction (North-South) and the other corresponds to motion across the roadway in the other direction (East-West). The quadrants are labeled: Quadrant #1A (NorthWest), Quadrant #1B (NorthWest), Quadrant #2A (NorthEast), Quadrant #2B (NorthEast), Quadrant #3A (SouthWest), Quadrant #3B (SouthWest) and Quadrant #4A (SouthEast), Quadrant #4B (SouthEast). The Field Labels used in the database use the following alpha prefix: NW for Counting Keys in Quadrant #1A and #1B; NE Counting Keys in Quadrant #2A and #2B; SW Counting Keys in Quadrant #3A and #3B; and SE Counting Keys in Quadrant #4A and #4B. In each of the quadrants, the keys 916 have been assigned a unique key ID and unique display field ID used to show the individual Key's Volume while counting. Quadrants #1A and 1B designated (NW) and Quadrants #2A and 2B designated (NE) are used as the default north setting for the Pedestrian Counting 916 key map to record the counting data. Similar to the Traffic Data Collection Screen 700, these Quadrants always appear towards the top of the portable device 200 since the application, in this embodiment, is in a landscape orientation and cannot be rotated.

The Pedestrian Counting Keys 916 have two categories: Pedestrians 930 and Jay Walkers 932 that are further divided into Adult 934, School 936, and Pre-School 938 aged walkers. By dividing the walkers into these categories, the analysis may be able to determine when pedestrian walk signs should be more active or less active. For example, if there are a high number of jaywalkers, it may be advantageous to set the pedestrian walk signs to be more active during particular period in order to reduce the number of jaywalkers and improve safety. Similar to the Traffic Data Collection Screen 700, the study period is divided into 15 minute slices of time which may be varied depending on the desired resolution of data. For pedestrian traffic, intervals of 1 hour are typically sufficient.

Figure 10A:
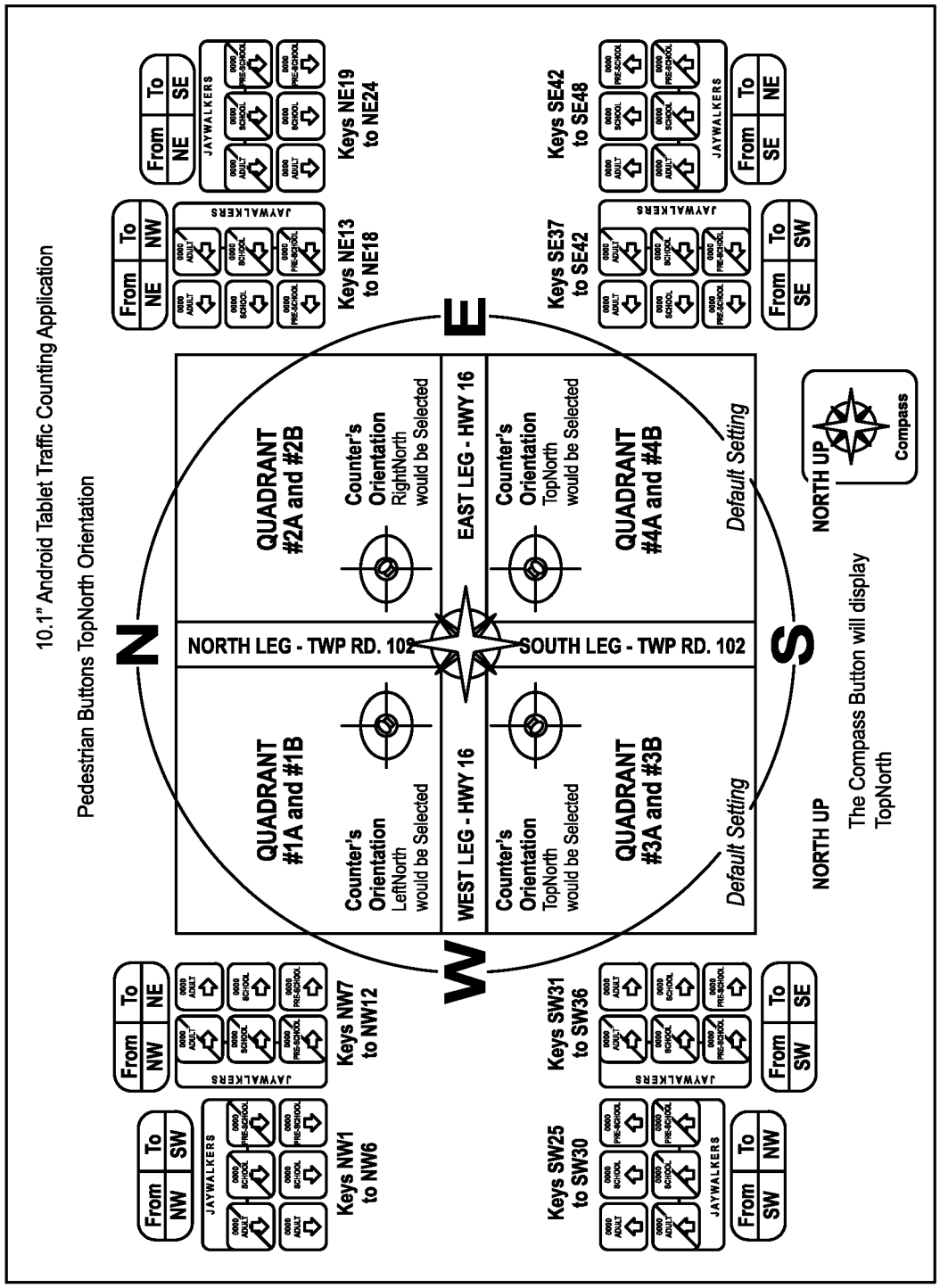
FIGS. 10A to 10D show a quadrant map for each of the four cardinal directions for the pedestrian data collection screen.

If the orientation of portable device 200 has a north orientation different than actual North, like the Traffic Data Collection Screen 700, the Pedestrian Counting Keys 916 are remapped (S757 and S758) as shown more clearly with reference to FIG. 9C and with respect to FIGS. 10A to 10D. FIG. 10A demonstrates the quadrant layout when North matches the top edge of the portable device 200.

Figure 10B:
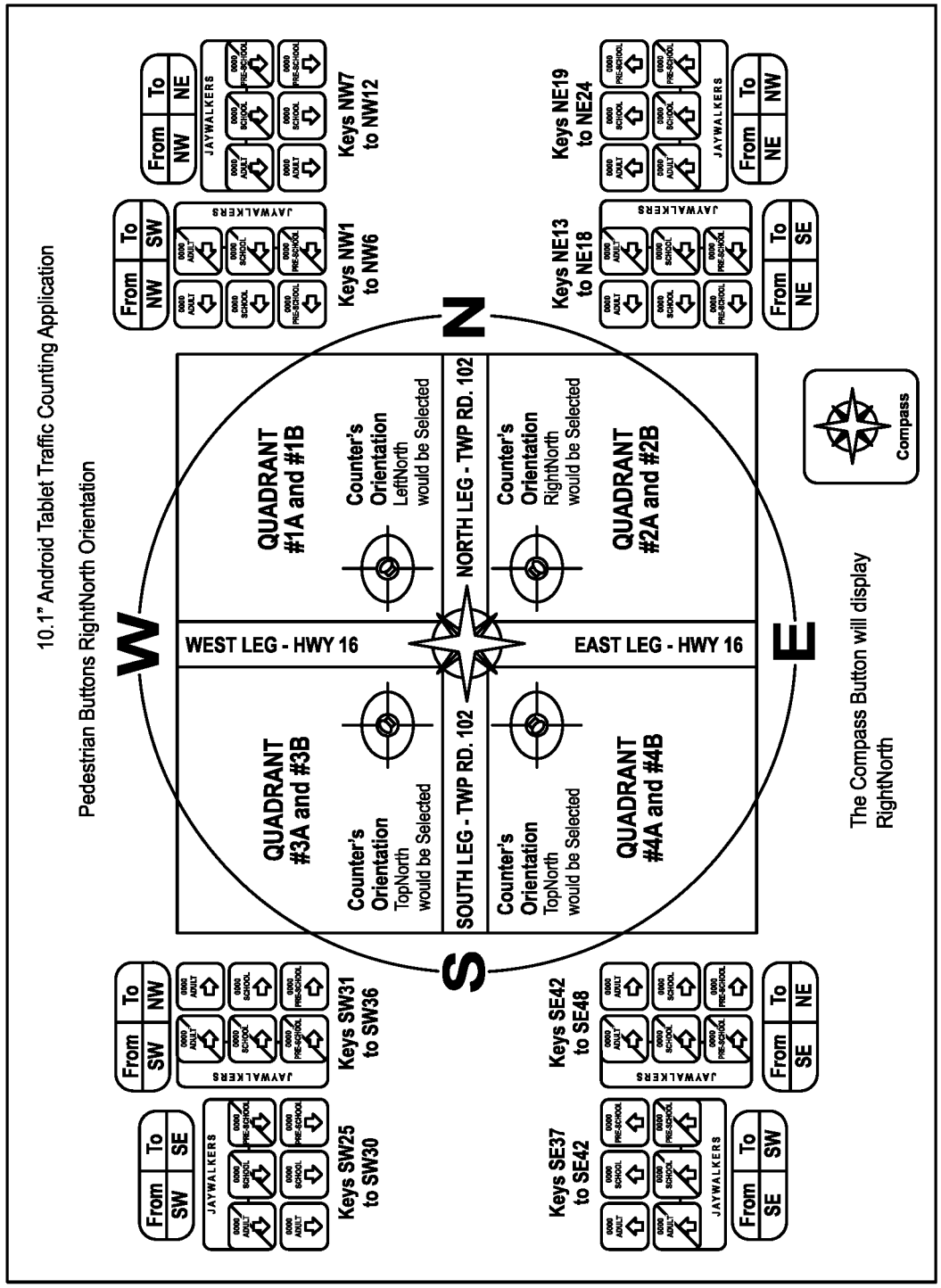
Figure 10C:
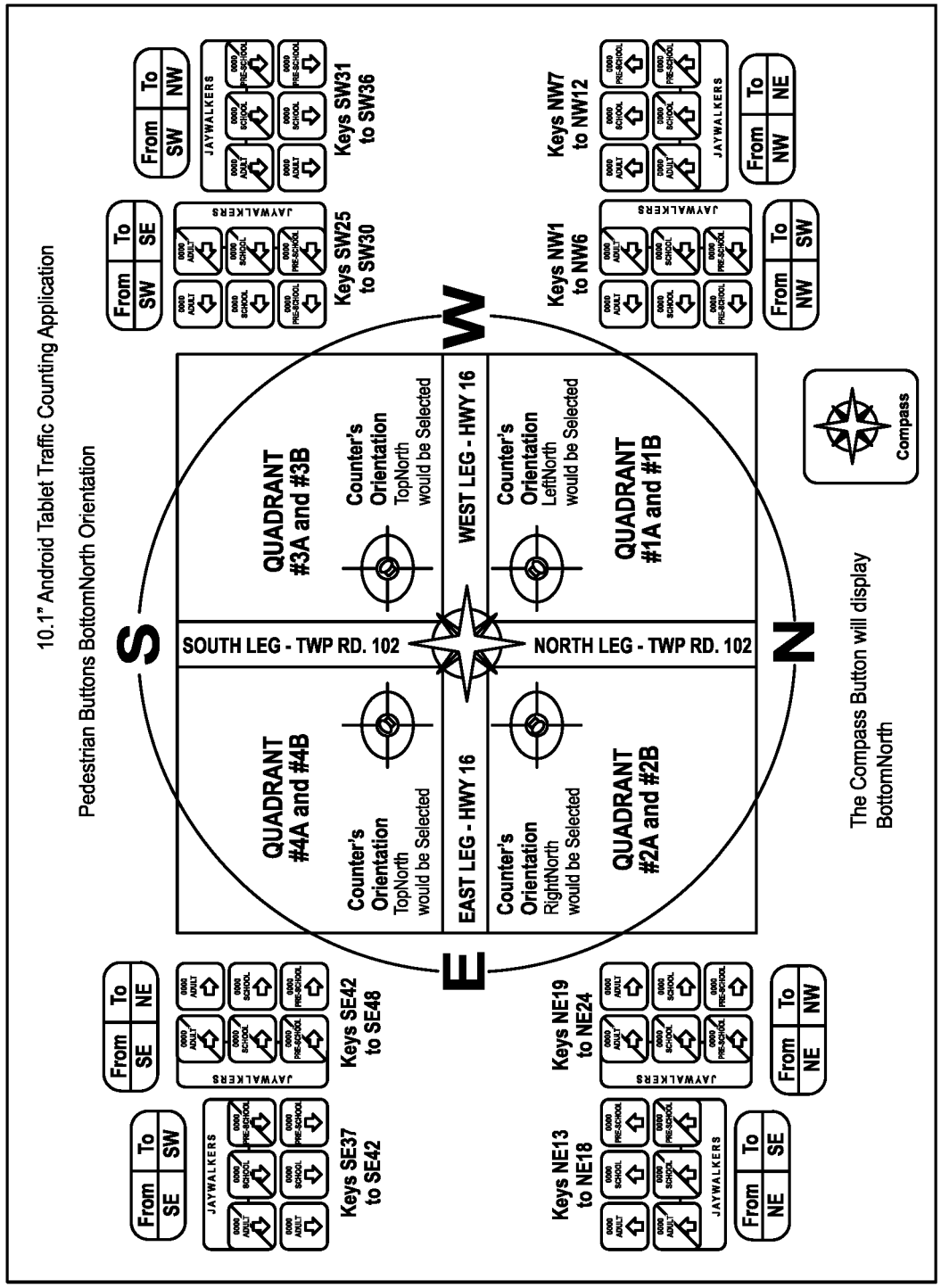

When the user is facing West (e.g. North is in the user's Right direction, known as RightNorth in FIG. 9C and shown in FIG. 10B):

The Pedestrian Key Numbers 916 in Quadrant #2A and #2B (NE) are remapped to input the data and display the Current Key Volume 930 as if were inputted from the Pedestrian Key Numbers 916 in Quadrant #1A and #1B (NW). The Pedestrian Key Numbers 916 in Quadrant #3A and #3B (SW) are remapped to input the data and display the Current Key Volume 930 as if were inputted from the Pedestrian Key Numbers 916 in Quadrant #4A and #4B (SE). The Pedestrian Key Numbers in Quadrant #4A and #4B (SE) are remapped to input the data and display the Current Key Volume 930 as if were inputted from the Pedestrian Key Numbers 916 in Quadrant #2A and #2B (NE). The Pedestrian Key Numbers 916 in Quadrant #1A and #1B (NW) are remapped to input the data and display the Current Key Volume 930 as if were inputted from the Pedestrian Key Numbers 916 in Quadrant #3A and #3B (SW).

When the user is facing South (e.g. North is behind the user, known as BottomNorth in FIG. 9C and shown in FIG. 10C):

The Pedestrian Key Numbers 916 in Quadrant #4A and #4B (SE) are remapped to input the data and display the Current Key Volume 930 as if were inputted from the Pedestrian Key Numbers 916 in Quadrant #1A and #1B (NW). The Pedestrian Key Numbers 916 in Quadrant #3A and #3B (SW) are remapped to input the data and display the Current Key Volume 930 as if were inputted from the Pedestrian Key Numbers 916 in Quadrant #2A and #2B (NE). The Pedestrian Key Numbers 916 in Quadrant #1A and #1B (NW) are remapped to input the data and display the Current Key Volume 930 as if were inputted from the Pedestrian Key Numbers 916 in Quadrant #4A and #4B (SE). The Pedestrian Key Numbers 916 in Quadrant #2A and #2B (NE) are remapped to input the data and display the Current Key Volume 930 as if were inputted from the Pedestrian Key Numbers 916 in Quadrant #3A and #3B (SW).

Figure 10D:
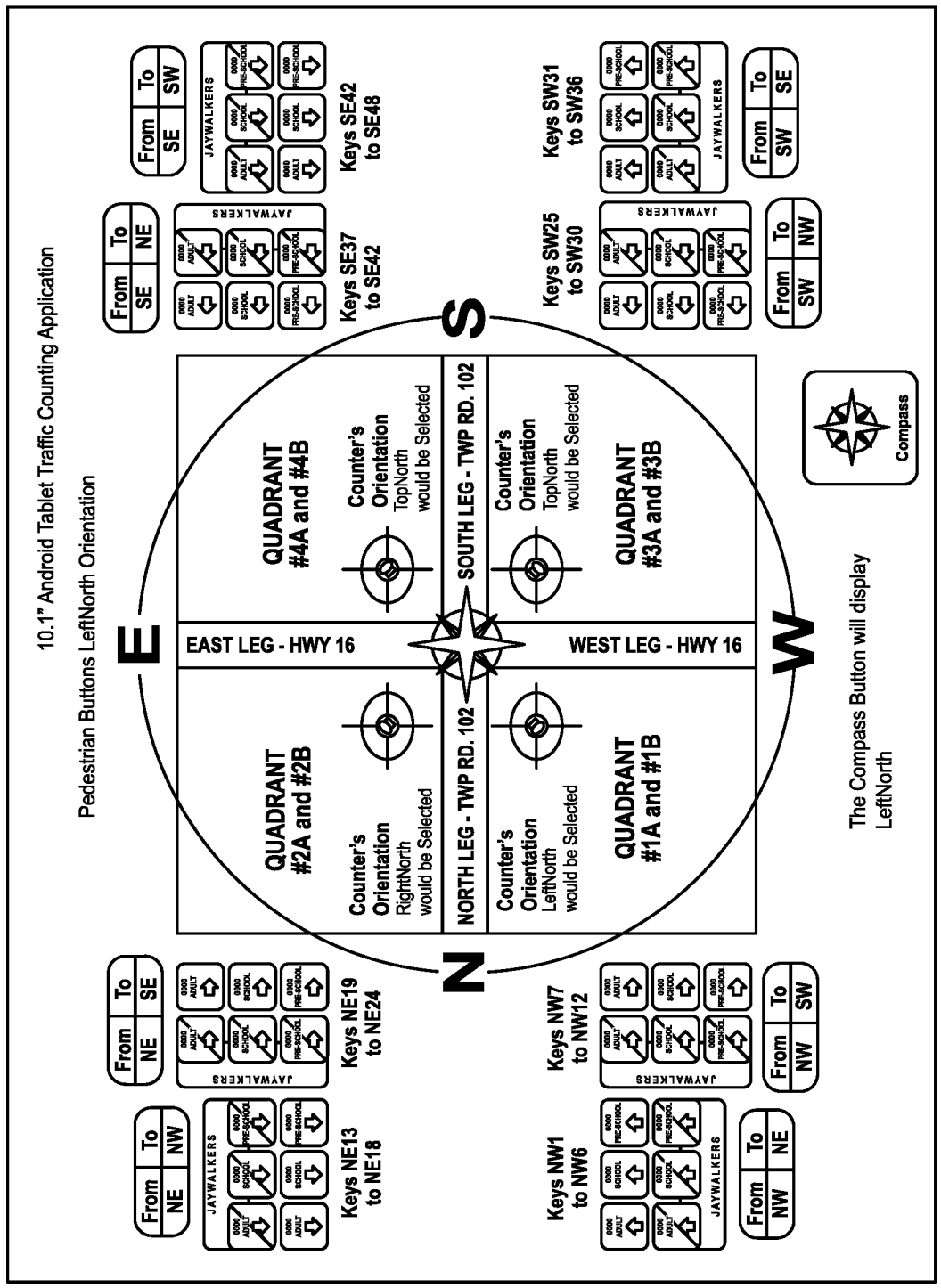

When the user is facing East, (e.g. North is in the user's Left direction, known as LeftNorth in FIG. 9C and shown in FIG. 10D):

The Pedestrian Key Numbers 916 in Quadrant #3A and #3B (SW) are remapped to input the data and display the Current Key Volume 930 as if were inputted from the Pedestrian Key Numbers in Quadrant #1A and #1B (NW). The Pedestrian Key Numbers 916 in Quadrant #1A and #1B (NW) are remapped to input the data and display the Current Key Volume 930 as if were inputted from the Pedestrian Key Numbers 916 in Quadrant #2A and #2B (NE). The Pedestrian Key Numbers 916 in Quadrant #2A and #2B (NE) are remapped to input the data and display the Current Key Volume 930 as if were inputted from the Pedestrian Key Numbers 916 in Quadrant #4A and #4B (SE). The Pedestrian Key Numbers 916 in Quadrant #4A and #4B (SE) are remapped to input the data and display the Current Key Volume 930 as if were inputted from the Pedestrian Key Numbers in Quadrant #3A and #3B (SW).

Although the user interface described herein is a button-based user interface, the inventor contemplates other use models are possible such as wizard-based, menu-based, or command-line based.

Although the embodiments herein describe an application with a traditional four point intersection, the inventor contemplates intersections with less than a four point intersection such as a three way intersection or measuring the traffic along a road. The inventor also contemplates intersections with more than a four point intersection, such as a traffic circle, or intersections that may be commonly found in Boston, Mass. that were created prior to the invention of the automobile.

If the orientation of North changes during counting, an alternative embodiment may remap the Traffic and Pedestrian counting keys automatically (S766 and S768).

Alternatively the weather information can be automatically changed during counting at the intersection by periodically retrieving weather information from a weather forecasting service and updating the information in the database. The inventor contemplates that such automatic weather updating may be overridden by the user in the event that the weather information from the weather forecasting service is incorrect.

Although the application displays a simple 'fixed' intersection, the inventor contemplates displaying more complex intersections using an online mapping service such as Google Maps. The intersection may be displayed using the online mapping service's maps with the counting buttons overlaying the map proximate to the appropriate area on the map or alternatively within a threshold distance from the center of the intersection. The map may automatically adjust the orientation using the GPS/Orientation sensor 218 of the portable device 200. Alternatively, the orientation may be obtained from the GPS/Orientation sensor 218 during a calibration period and subsequently fixed.

Although the application displays the Select Road Conditions 704, Select Weather Conditions 706, Compass 708, the inventor contemplates that one or all of these sections of the screen may be minimized in order to provide a larger area for the intersection map. The inventor also contemplates that these sections may be unnecessary if this data is automatically retrieved from online services and/or GPS/orientation data.

Although the present embodiment displays the Traffic Data Collection 700 and Pedestrian Data Collection 900 screens separately, the inventor contemplates that these could be two different layers that may overlie the same map.

Although the Video Mode of the present embodiment is run in 'real-time', the inventor contemplates that the video may be run slower or faster than real-time. Initiation of this fast forward or slow motion modes may be initiated by the user using buttons or may be automatically determined based on the number of roads intersecting or the number of vehicles counted in the previous interval. For example, if the intersection is very busy and/or has many roads intersecting, it may be advantageous to slow the video down to ensure capture of accurate data. In another example, if the intersection is not very busy and/or has few roads intersecting, it may be advantageous to speed up the video to ensure efficient use of the user's time. Accordingly, the clock would present the time as proceeding faster or slower than normal. Alternatively, a speed indicator such as "1.5×" may be displayed next to the clock 420. The inventor contemplates that the user may override any automatic adjustment to the playback speed.

Although the present embodiments discloses buttons having a predetermined assignment, the inventor contemplates that the buttons may be user assignable to different vehicle classifications. For example, the user may assign buttons that are lower in the alphabet (e.g. A, B, C, etc.) with higher probability vehicles for a particular intersection. This assignment may be performed by entering a configuration mode and selecting a vehicle type from a list of vehicles.

Although the buttons are labeled with alphabetic characters, the inventor contemplates that the counting buttons may alternately (or in addition) to the alphabetic character display an icon associated with the type of vehicle.

Although the present embodiment discloses using buttons in a series of columns to indicate a left, right, or straight motion for the type of vehicle, the inventor contemplates that the user may select from a single row (or column) of buttons and use a gesture to drag the button in order to indicate the path taken by the vehicle or pedestrian through the intersection. This is particularly advantageous when an intersection has many roads intersecting in non-perpendicular orientations where the vehicle has more choices than right, left and straight.

Although the present embodiment discloses remapping the counters to the fields, the inventor contemplates that the buttons may be remapped to different counters in response to an orientation change.

In an alternative embodiment, the confirmation prompts asking the user for confirmation of an action may not be displayed.

The database as described herein may be a comma-separated value (CSV) formatted file, tab-separated value file, XML database, SQL database, Filemaker®, Access Database, Oracle Database or any other type of database known to those of skill in the art. In an alternative, the portable device 200 may use a simple database and the offsite server 120 may receive this simple database and incorporate it in a more complex database.

Although the embodiments herein use the term "quadrant", the inventor does not use quadrant in a strictly mathematical sense (e.g. four regions). The inventor contemplates that with locations with different number of points will have more quadrants, otherwise known mathematically as sections or arcs in between the roads that may be non-perpendicular with respect to each other.

Although the flowchart(s) described herein demonstrate a particular program architecture, this is not to be limiting and other programming paradigms are possible such as, but not limited to, event-driven programming, agent-oriented programming, data-driven programming, functional programming, logical programming, end-user programming, expression-oriented programming, semantic programming, object-oriented programming, state machines, etc.

Although the embodiments described herein have a processor 202 and 302 associated with the portable device 104 and server 120, the inventor contemplates that other processing structures may be used to implement the embodiments described, such as multi-core processors, multiple processors, distributed processing, cell-based processing, cloud-based processing, etc.

The above-described embodiments are intended to be examples of the present invention and alterations and modifications may be effected thereto, by those of skill in the art, without departing from the scope of the invention, which is defined solely by the claims appended hereto.

What is claimed is:

1. A device for collecting traffic data comprising:
   a touch screen display;
   a computer readable medium;
   an orientation sensor configured to report a current orientation; and
   a processor configured to execute instructions stored on said computer readable medium for:
   displaying on said touch screen display a representation of an intersection comprising a plurality of legs in different directions;
   displaying on said touch screen display a first plurality of count buttons on each one of said plurality of legs, each one of said first plurality of count buttons representing a vehicle type moving in a first direction of motion on each one of said plurality of legs;
   displaying on said touch screen display a second plurality of count buttons on each one of said plurality of legs, each one of said second plurality of count buttons representing a vehicle type moving in a second direction of motion on each one of said plurality of legs;
   associating each one of said first and second plurality of count buttons with an associated counter, said touch screen display configured to detect contact with each one of said first and second plurality of count buttons, and said processor configured to increment the associated counter in response to said contact;
   wherein said processor is configured to record each associated counter with said first and second plurality of count buttons to a database along with a time code at the end of a predetermined slice of time;
   setting an original orientation during a calibration period; and
   remapping each one of said first and second plurality of count buttons to a different counter in response to an orientation change.

2. The device for collecting traffic data according to claim 1 wherein the processor is further configured to execute instructions to display an orientation indicator indicating an original orientation on the touch screen display.

3. The device for collecting traffic data according to claim 2 wherein when the touch screen display is configured to detect contact with the orientation indicator in a region different from the original orientation, and upon the touch screen display detecting said contact with the orientation indicator a new orientation is selected.

4. The device for collecting traffic data according to claim 2 wherein when the touch screen display is configured to detect contact with the orientation indicator, a new orientation is selected from a predefined set of orientations.

5. The device for collecting traffic data according to claim 2 wherein the processor is further configured to process the current orientation to determine a new orientation; and to update the orientation indicator.

6. The device for collecting traffic data according to claim 5 wherein the processor updates the orientation indicator only during a calibration period.

7. The device for collecting traffic data according to claim 3 wherein on an orientation change, the processor is further configured to automatically record each counter associated with each one of said plurality of count buttons into the correct database field corresponding to the new orientation.

8. The device for collecting traffic data according to claim 1 further comprising the processor configured to execute instructions to display at least one multiplier button on the display; the touch screen configured to detect contact with the at least one multiplier button and to detect contact with at least one of said plurality of count buttons; the processor configured to add the contacted count buttons to a multiplier list wherein subsequent contacts with the contacted count buttons are multiplied by a multiplier corresponding to the at least one multiplier button.

9. The device for collecting traffic data according to claim 8 further comprising the processor configured to execute instructions to display a multiplier reset button; the touch screen configured to detect contact with the multiplier reset button; whereby the processor removes all the count buttons from the multiplier list.

10. The device for collecting traffic data according to claim 1 further comprising a transceiver configured to automatically transmit each counter according to a time interval.

11. The device for collecting traffic data according to claim 10 wherein the time interval is 15 minutes.

12. The device for collecting traffic data according to claim 10 wherein the processor resets each counter value on successful transmission by the transceiver.

13. The device for collecting traffic data according to claim 10 wherein the processor resets each counter value based on the time interval.

14. The device for collecting traffic data according to claim 1 further comprising the processor configured to execute instructions to display a send button; the touch screen display configured to detect contact with the send button and to initiate the transceiver to transmit each counter.

15. The device for collecting traffic data according to claim 1 further comprising the processor configured to execute instructions to display a vehicle data collection screen and a pedestrian data collection screen.

* * * * *